(12) United States Patent
Gupta et al.

(10) Patent No.: US 8,510,596 B1
(45) Date of Patent: Aug. 13, 2013

(54) SYSTEM AND METHODS FOR RUN TIME DETECTION AND CORRECTION OF MEMORY CORRUPTION

(75) Inventors: Satya V. Gupta, Acton, MA (US); Prashant Shenoy, Northampton, MA (US)

(73) Assignee: Virsec Systems, Inc., Acton, MA (US)

( * ) Notice: Subject to any disclaimer, the term of this patent is extended or adjusted under 35 U.S.C. 154(b) by 156 days.

(21) Appl. No.: 11/825,657

(22) Filed: Jul. 6, 2007

Related U.S. Application Data

(63) Continuation-in-part of application No. 11/673,541, filed on Feb. 9, 2007, now abandoned.

(60) Provisional application No. 60/771,734, filed on Feb. 9, 2006.

(51) Int. Cl.
*G06F 11/00* (2006.01)

(52) U.S. Cl.
USPC .......... 714/15; 714/21; 714/42; 717/138

(58) Field of Classification Search
USPC .......... 714/5, 42, 5.11, 15, 21; 717/138
See application file for complete search history.

(56) References Cited

U.S. PATENT DOCUMENTS

| | | | | |
|---|---|---|---|---|
| 4,672,534 A * | 6/1987 | Kamiya | ............ | 714/30 |
| 4,751,667 A * | 6/1988 | Ross | ............ | 714/718 |
| 5,235,551 A * | 8/1993 | Sinofsky et al. | ............ | 365/94 |
| 5,359,659 A * | 10/1994 | Rosenthal | ............ | 726/24 |
| 5,826,012 A * | 10/1998 | Lettvin | ............ | 726/22 |
| 5,829,039 A * | 10/1998 | Sugino et al. | ............ | 711/144 |
| 5,850,559 A * | 12/1998 | Angelo et al. | ............ | 713/320 |
| 5,890,005 A * | 3/1999 | Lindholm | ............ | 713/320 |
| 5,909,580 A * | 6/1999 | Crelier et al. | ............ | 717/141 |
| 5,933,594 A * | 8/1999 | La Joie et al. | ............ | 714/26 |
| 6,151,618 A * | 11/2000 | Wahbe et al. | ............ | 718/1 |
| 6,832,302 B1 * | 12/2004 | Fetzer et al. | ............ | 711/170 |
| 6,948,091 B2 * | 9/2005 | Bartels et al. | ............ | 714/11 |
| 6,973,577 B1 * | 12/2005 | Kouznetsov | ............ | 726/25 |
| 6,981,176 B2 * | 12/2005 | Fruehling et al. | ............ | 714/11 |
| 7,257,763 B1 * | 8/2007 | Srinivasan et al. | ............ | 714/764 |
| 7,272,748 B1 * | 9/2007 | Conover et al. | ............ | 714/20 |
| 7,386,839 B1 * | 6/2008 | Golender et al. | ............ | 717/131 |
| 7,484,239 B1 * | 1/2009 | Tester et al. | ............ | 726/2 |
| 7,526,654 B2 * | 4/2009 | Charbonneau | ............ | 713/188 |
| 7,526,755 B2 * | 4/2009 | DeLine et al. | ............ | 717/126 |
| 7,539,875 B1 * | 5/2009 | Manferdelli et al. | ............ | 713/189 |
| 7,603,715 B2 * | 10/2009 | Costa et al. | ............ | 726/25 |

(Continued)

OTHER PUBLICATIONS

Ashcraft, K. and Engler, D., "Using Programmer-Written Compiler Extensions to Catch Security Holes," Slides presented at the Proceedings of the IEEE Symposium on Security and Privacy, Berkeley, CA, pp. 1-14, (May 2002).

(Continued)

*Primary Examiner* — Loan L. T. Truong
(74) *Attorney, Agent, or Firm* — Hamilton, Brook, Smith & Reynolds, P.C.

(57) ABSTRACT

A method or apparatus detects a memory corruption of at least one portion of memory during run-time and corrects the memory corruption of the at least one portion of memory by replacing the at least one portion of memory with a backup of the at least one portion of memory. In this way, memory corruption can be corrected in a timely fashion while minimizing security risks.

33 Claims, 24 Drawing Sheets

(56) References Cited

U.S. PATENT DOCUMENTS

| | | | | |
|---|---|---|---|---|
| 7,613,954 | B2* | 11/2009 | Grey et al. | 714/38.14 |
| 7,634,812 | B2* | 12/2009 | Costa et al. | 726/25 |
| 7,644,440 | B2* | 1/2010 | Sinha et al. | 726/23 |
| 8,261,326 | B2* | 9/2012 | Ben-Natan | 726/4 |
| 2001/0033657 | A1* | 10/2001 | Lipton et al. | 380/201 |
| 2003/0033498 | A1* | 2/2003 | Borman et al. | 711/206 |
| 2003/0041290 | A1* | 2/2003 | Peleska | 714/47 |
| 2003/0145253 | A1* | 7/2003 | de Bonet | 714/38 |
| 2003/0188160 | A1* | 10/2003 | Sunder et al. | 713/165 |
| 2003/0188174 | A1* | 10/2003 | Zisowski | 713/189 |
| 2003/0191940 | A1* | 10/2003 | Sinha et al. | 713/176 |
| 2004/0049660 | A1* | 3/2004 | Jeppesen et al. | 712/219 |
| 2004/0103252 | A1* | 5/2004 | Lee et al. | 711/132 |
| 2004/0120173 | A1* | 6/2004 | Regev et al. | 365/49 |
| 2004/0157639 | A1* | 8/2004 | Morris et al. | 455/550.1 |
| 2004/0215755 | A1* | 10/2004 | O'Neill | 709/223 |
| 2004/0268095 | A1* | 12/2004 | Shpeisman et al. | 712/225 |
| 2004/0268319 | A1* | 12/2004 | Tousignant | 717/131 |
| 2005/0039178 | A1* | 2/2005 | Marolia et al. | 717/168 |
| 2005/0172115 | A1* | 8/2005 | Bodorin et al. | 713/152 |
| 2006/0021035 | A1* | 1/2006 | Conti et al. | 726/22 |
| 2006/0026311 | A1* | 2/2006 | Nicolai et al. | 710/22 |
| 2006/0075274 | A1* | 4/2006 | Zimmer et al. | 714/2 |
| 2006/0143707 | A1* | 6/2006 | Song et al. | 726/22 |
| 2006/0195745 | A1* | 8/2006 | Keromytis et al. | 714/741 |
| 2006/0248519 | A1* | 11/2006 | Jaeger et al. | 717/141 |
| 2006/0265438 | A1* | 11/2006 | Shankar et al. | 707/206 |
| 2006/0282891 | A1* | 12/2006 | Pasko | 726/23 |
| 2007/0027815 | A1* | 2/2007 | Sobel et al. | 705/59 |
| 2007/0118646 | A1* | 5/2007 | Gassoway | 709/225 |
| 2007/0157003 | A1* | 7/2007 | Durham et al. | 711/206 |
| 2007/0169075 | A1* | 7/2007 | Lill et al. | 717/168 |
| 2007/0192854 | A1* | 8/2007 | Kelley et al. | 726/22 |
| 2009/0217377 | A1* | 8/2009 | Arbaugh et al. | 726/23 |

OTHER PUBLICATIONS

Austin, T., et al., "Efficient Detection of All Pointer and Array Access Errors," Proceedings of the ACM SIGPLAN 94 Conference on Programming Language Design and Implementation, Orlando, FL (Jun. 1994).

Baratloo, A., et al., "Transparent Run-Time Defense Against Stack Smashing Attacks," Proceedings of the USENIX 2000 Annual Technical Conference, San Diego, CA (Jun. 2000).

Barrantes, E., et al., "Randomized Instruction Set Emulation to Distrupt Binary Code Injection Attacks," Proceedings of the 10th Annual ACM Conference on Computer and Communications Security, Washington, DC (Oct. 2003).

Berger, E. and Zorn, B., "Diehard: Probabilistic Memory Safety for Unsafe Languages," Proceedings of the Programming Language Design and Implementation (PLDI), (Jun. 2006).

Bhatkar, S., et al., Address Obfuscation: An Efficient Approach to Combat a Broad Range of Memory Error Exploits, Proceedings of the 12th USENIX Security Symposium, Washington, DC (Aug. 2003).

http://bochs.sourceforge.net, The Open Source IA-32, 59 pages, retrieved from Internet Nov. 15, 2007.

Bush, W., et al., "A Static Analyzer for Finding Dynamic Programming Errors," Software: Practice and Experience, 30(7): 775-802 (2000).

www.cert.org, Computer Emergency Response Team (CERT), 2 pages, retrieved from Feb. 3, 2009. Internet Feb. 3, 2009.

Pyo, Changwoo and Lee, Gyungho, "Encoding Function Pointers and Memory Arrangement Checking Against Buffer Overflow Attack," 4th International Conference Information and Communications Security (ICICS), pp. 25-36 (Dec. 2002).

Chew, M. and Song, D., "Mitigating Buffer Overflows by Operating System Randomization," (Report No. CMU-CS-02-197), Carnegie Mellon University, 11 pages. (Dec. 2002).

Chiueh, T. and Hsu, F., "RAD: A Compile-Time Solution to Buffer Overflow Attacks," Proceedings of the 21st International Conference on Distributed Computing Systems, Pheonix, AZ, (Apr. 2001).

Cowan, C., et al., "Stackguard: Automatic Adaptive Detection and Prevention of Buffer-Overflow Attacks," Proceedings of the 7th USENIX Security Conference, San Antonio, TX, (Jan. 1998).

Cowan, C., et al., "FormatGuard: Automatic Protection from Printf Format String Vulnerabilities," Proceedings of the 10th USENIX Security Symposium, Washington, DC, (Aug. 2001).

Cowan, C., et al., "Protecting Systems from Stack Smashing Attacks with Stackguard," Linux Expo, Raleigh, NC (May 1999).

Cowan, C., et al., "PointGuard™: Protecting Pointers From Buffer Overflow Vulnerabilities," Proceedings of the 12th USENIX Security Symposium, Washington, DC, (Aug. 2003).

Dhurjati, D., et al., "Memory Safety Without Runtime Checks or Garbage Collection," Proceedings of the 2003 ACM SIGPLAN Conference on Language, Compiler, and Tool Support for Embedded Systems, San Diego, CA (Jun. 2003).

Dor, S., et al., "Cleanness Checking of String Manipulation in C Programs via Integer Analysis," Proceedings of the 8th International Static Analysis Symposium, Paris, France, Springer LNCS 2126:194-212 (2002).

Erlingsson, U. and Schneider, F., "SASI Enforcement of Security Policies: A Retrospective," Proceedings of the New Security Paradigm Workshop, Caledon Hills, Ontario, Canada, (Sep. 1999).

Etoh, H. and Yoda, K., "Protecting from Stack-Smashing Attacks," IBM Research Division, Tokyo Research Laboratory, Jun. 2000, www.trl.ibm.com, 23 pages, retrieved from Internet Nov. 6, 2007.

Evans, D. and Larachelle D., "Improving Security Using Extensible Lightweight Static Analysis," IEEE Software, 19(1):43-51 (Jan.-Feb. 2002).

Evans, D., "Policy-Directed Code Safety," Proceedings of the IEEE Symposium on Security and Privacy, Oakland, CA, (May 1999).

Feng, H., et al., "Anomaly Detection using Call Stack Information," IEEE Security and Privacy, Oakland, CA (May 2003).

Fink, G. and Bishop, M., "Property-Based Testing: A New Approach to Testing for Assurance," ACM SIGSOFT Software Engineering Notes, 22(4): 74-80 (Jul. 1997).

Forrest, S., et al, "A Sense of Self for Unix Processes," Proceedings of the IEEE Symposium on Security and Privacy, Oakland, CA, (May 1996).

Foster, J., et al., "A Theory of Type Qualifiers," Proceedings of the 1999 ACM SIGPLAN Conference on Programming Language Design and Implementation (PLDI), Atlanta, GA (May 1999).

Frantzen, M. and Shuey, M., "StackGhost: Hardware Facilitated Stack Protection," Proceedings of the 10th USENIX Security Symposium, Washington, DC, (Aug. 2001).

Ganapathy, V., et al., "Buffer Overrun Detection using Linear Programming and Static Analysis," Proceedings of the 10th ACM Conference on Computer and Communication Security, Washington D.C, (Oct. 2003).

Gaurav, S., et al., "Countering Code-Injection Attacks With Instruction-Set Randomization," Proceedings of the 10th ACM Conference on Computer and Communications Security (CCS2003), Washington, DC, (Oct. 2003).

Ghosh, A.K. and O'Connor, T., "Analyzing Programs for Vulnerability to Buffer Overrun Attacks," Proceedings of the 21st NIST-NCSC National Information Systems Security Conference. (Oct. 1998).

Goldberg, I., et al.., "A Secure Environment for Untrusted Helper Applications," Proceedings of the 6th USENIX Security Symposium, San Jose, CA, (Jul. 1996).

Grimes, R., "Preventing Buffer Overruns in C++," Dr Dobb's Journal: Software Tools for the *Professional Programmer*, 29(1): 49-52 (Jan. 2004).

Hastings, R. and Joyce, B., "Purify: Fast Detection of Memory Leaks and Access Errors," Proceedings of the Winter 92 USENIX *Conference*, San Francisco, CA, (Jan. 1992).

Haugh, E. and Bishop, M., "Testing C Programs for Buffer Overflow Vulnerabilities," Proceedings of the 10th Network and Distributed System Security Symposium (NDSS03), San Diego, CA, (Feb. 2003).

Jim, T., et al., "Cyclone: A safe dialect of C," Proceedings of the USENIX Annual Technical Conference, Monterey, CA, (Jun. 2002).

Jones, Richard W. M. and Kelly, Paul H. J., "Backwards-Compatible Bounds Checking for Arrays and Pointers in C Programs," Proceedings of the 3rd International Workshop on Automatic Debugging, Linkoping, Sweden, 29 pages (May 1997).

Kendall, Samuel C., "Bcc: Runtime Checking for C Programs," Proceedings of the USENIX Summer 1983 Conference, Toronto, Ontario, Canada, (Jul. 1983).

Kiriansky, V., et al., "Secure Execution Via Program Shepherding," Proceedings of the 11$^{th}$ USENIX Security Symposium, San Francisco, CA, (Aug. 2002).

Phrack Magazine, "The Frame Pointer Overwriting," 55(9): 1-9 (Sep. 1999).

Krennmair, A., "ContraPolice: a libc Extension for Protecting Applications from Heap-Smashing Attacks," www.synflood.at/contrapolice, 5 pages, retrieved from Internet, Nov. 28, 2003.

Larochelle, D. and Evans, D., "Statically Detecting Likely Buffer Overflow Vulnerabilities," 2001 USENIX Security Symposium, Washington, D. C. (Aug. 2001).

Larson, E, and Austin, T., "High Coverage Detection of Input-Related Security Faults," Proceedings of the 12th USENIX Security Symposium, Washington, district of Columbia, U.S.A, (Aug. 2003).

Larus, J. R., et al., "Righting Software," IEEE Software, 21(3): 92-100 (2004).

Lee, R. B., et al., "Enlisting Hardware Architecture to Thwart Malicious Code Injection," First International Conference on Security in Pervasive Computing, LNCS vol. 2802, pp. 237-252, (2003).

Lhee, K. and Chapin, S., "Buffer Overflow and Format String Overflow Vulnerabilities," Software-Practice and Experience, 33(5): 423-460 (Apr. 2003).

Lhee, K. and Chapin, S., "Type-Assisted Dynamic Buffer Overflow Detection," Proceedings of the 11$^{th}$ USENIX Security Symposium, San Francisco, CA, (Aug. 2002).

Messier, M. and Viega, J., "Safe C String Library V1.0.3.," www.zork.org/safestr, 33 pages, retrieved from Internet, Nov. 2003.

www.metasploit.org, "Metasploit Projects," -2 pages, retrieved from Internet Feb. 3, 2009.

Necula, G., et al., "CCured: Type-Safe Retrofitting of Legacy Code," 29th SIGPLAN-SIGACT Symposium on Principles of Programming Languages (POPL), Portland, OR, pp. 128-139 (Jan. 2002).

Nergal, "The advanced return-into-libc exploits, PaX Case Study," Phrack Magazine, 58(4), 30 pages (Dec. 2001).

The NX Bit. Wikipedia article, www.wikipedia.org/wiki/NXbit, 9 pages, retrieved from Internet—Feb. 3, 2009.

Orwa, Y, et al., "Fail-Safe ANSI-C Compiler: An Approach to Making C Programs Secure," Proceedings of the International Symposium on Software Security, Tokyo, Japan, (Nov. 2002).

Ozdoganoglu, H., et al., "SmashGuard: A Hardware Solution to Prevent Security Attacks on the Function Return Address," (Report No. TR-ECE. 03-13), Purdue University (2004).

The PaX project. Powepoint presentation, Date of publication to be provided.

Bruce Perens, Electric Fence Malloc Debugger, www.perens.com/FreeSoftware, 10 pages, (Mar. 20, 2006).

Prasad, M. and Chiueh., T., "A Binary Rewriting Defense against Stack-Based Buffer Overflow Attacks," USENIX Technical Conference (Jun. 2003).

Prevelakis, V. and Spinellis, D., "Sandboxing Applications" Proceedings of the 2001 USENIX Annual Technical Conference (FREENIX Track), Boston, MA (Jun. 2001).

Provos, N., "Improving Host Security with System Call Policies," Proceedings of the 12$^{th}$ USENIX Security Symposium, Washington, DC, (Aug. 2003).

RATS website. Secure Software Inc., http://www.securesw.com/downloadrats.htm, retrieved from Internet 2009.

Engler, D., et al., "Checking System Rules Using System-Specific, Programmer-Written Complier Extenstions", Stanford University, (date of publication to be provided).

Robertson, W., "Run-time Detection of Heap-based Overflows," Proceedings of the 17$^{th}$ Large Installation Systems Administrators Conference, San Diego, CA, (Oct. 2003).

Rugina, R. and Rinard, M., "Symbolic Bounds Analysis of Pointers, Array Indices, and Accessed Memory Regions," Proceedings of the ACM SIGPLAN Conference on Programming Language Design and Implementation, Vancouver, BC, Canada, (Jun. 2000).

Ruwase, O. and Lam, M.S., "A Practical Dynamic Buffer Overflow Detector," Proceedings of the 11$^{th}$ Annual Network and Distributed System Security Symposium, San Diego, CA (Feb. 2004).

Schneider, F. B., "Enforceable Security Policies," ACM Transactions on Information and System Security, 3(1): 30-50 (Feb. 2000).

Sekar, R., et al., "A Fast Automaton-Based Method for Detecting Anomalous Program Behaviors," Proceedings of the IEEE Symposium on Security and Privacy, Oakland, CA, (May 2001).

Simon, A. and King, A., "Analyzing String Buffers In C," In Proc. Intl. Conference on Algebraic Methodology and Software Technology, LNCS 2422: 365-380 (Sep. 2002).

Simon, I., "A Comparative Analysis of Methods of Defense against Buffer Overflow Attacks," Technical report, California State Univ, 2001. [http://www.mcs.csuhayward.edu/~simon/security/boflo.html], 11 pages. (Jan. 2001).

Small, C., "A Tool for Constructing Safe Extensible C++ Systems," 3rd USENIX Conference-Object-Oriented Technologies, Portland, OR, pp. 175-184 (Jun. 1997).

Alexander Snarskii, Freebsd libc stack integrity patch, ftp://ftp.lucky.net/pub/unix/local/ libc-letter, 5 pages. (Feb. 1997).

Wojtczuk, R., "Defeating Solar Designer's Non-executable Stack Patch," http://www.openwall.com, 11 pages. (Jan. 1998).

Vendicator, Stack Shield, "A 'stack smashing' technique protection tool for Linux," http://www.angelfire.com/sk/stackshield, 1 page. (retrieved from Internet Feb. 2010).

Steffen, J. L., "Adding Run-Time Checking to the Portable C Compiler," Software: Practice and Experience, 22(4): 305-316 (Apr. 1992).

Suffield, A., "Bounds Checking for C and C++," Technical Report, Imperial College, 55 pages. (2003).

Tannenbaum, A S., "Distributed Operating Systems," Prentice Hall, (1995).

Viega, J., et al., "ITS4: A Static Vulnerability Scanner for C and C++ Code," Proceedings of the 16$^{th}$ Annual Computer Security Applications Conference, New Orleans, LA, (Dec. 2000).

VMware Server 2, Product DataSheet; VMWare Virtual Server, http://www.vmware.com.; retrieved from Internet, Feb. 3, 2010.

Wagner, D. and Dean, D., "Intrusion Detection via Static Analysis," IEEE Symposium on Security and Privacy, Oakland, CA, pp. 156-168 (May 2001).

Wagner, D., et al., "A First Step Towards Automated Detection of Buffer Overrun Vulnerabilities," Proceedings of the Networking and Distributed System Security Symposium, San Diego, CA, (Feb. 2000).

Wahbe, R..., "Efficient Software-Based Fault Isolation," Proceedings of the 14$^{th}$ ACM Symposium on Operating System Principles, Asheville, NC, (Dec. 1993).

Wheeler, David, Flawfinderwebsite, www.dwheeler.com/flawfinder/, 11 pages, date of publication and retrieval from internet to be provided.

Xie, Y., et al., "ARCHER: Using Symbolic, Path-sensitive Analysis to Detect Memory Access Errors," Proceedings of the 9$^{th}$ European Software Engineering Conference, Helsinki, Finland, (2003).

Xu, J., et al., "Transparent Runtime Randomization for Security," Proceedings of the 22$^{nd}$ International Symposium on Reliable Distributed Systems (SRDS'03), Florence, Italy (Oct. 2003).

Xu, J., et al., "Architecture Support for Defending Against Buffer Overflow Attacks," Proceedings of the Second Workshop on Evaluating and Architecting System dependability, San Jose, CA, (Oct. 2002).

Yong, Suan Hsi and Horwitz, Susan, "Protecting C Programs from Attacks Via Invalid Pointer Dereferences," Proceedings of the 9th European Software Engineering Conference, (Sep. 2003).

Zhu, G. and Tyagi, Z., "Protection Against Indirect Overflow Attacks on Pointers," Second Intl. Workshop on Information Assurance Workshop, pp. 97-106 (Apr. 2004).

http://box3n.gumbynet,org, "How to Stop a Hacker . . . ", 2 pages, date of publication and retrieval from internet to be provided.

* cited by examiner

|  | Code Segment | Data Segment | Heap Segment | Shared Segment | Stack Segment |
|---|---|---|---|---|---|
| Read | ● | ● | ● | ● | ● |
| Write |  | ● | ● |  | ● |
| Execute | ● |  |  | ● |  |

Fig. 2

SYSTEM AND METHODS FOR RUN TIME DETECTION AND CORRECTION OF MEMORY CORRUPTION

RELATED APPLICATIONS

This application is a Continuation-in-part of U.S. application Ser. No. 11/673,541, filed Feb. 9, 2007 now abandoned, which claims the benefit of U.S. Provisional Application No. 60/771,734 filed on Feb. 9, 2006. The entire teachings of the above applications are incorporated herein by reference.

BACKGROUND

In today's computing devices such as desktops, laptops, servers, workstations, etc. as well as mobile computers such as handhelds, smart phones and personal digital assistants etc and intelligent appliances such as home control systems, alarm systems, sprinkler systems, collectively called hardware clients hereafter, many software applications run concurrently. In order to have multiple applications run in parallel, the operating system in the client creates a separate process for each such application and assigns chunks of time from the Central Processing Unit (CPU) using a scheduling mechanism. Each application executes in a process that can utilize such virtual memory as was assigned to it at the time of creation of the process. This memory may become corrupted as the application executes thereby causing the application to perform unintended and even malicious actions on the user's computer

SUMMARY OF THE INVENTION

Many network accessible hardware clients are vulnerable to memory corruption attacks triggered by malicious attackers. Malicious attackers have strived hard to exploit such vulnerability and seize control of a user's computer remotely. Once control has been seized, arbitrary code of the attacker's choosing can be executed by the attacker. Usually the objective of the malicious attacker is to extract personal and/or confidential information from the user but it could also include disrupting personal or business activity of the user for the purpose of inflicting loss of productivity or even conduct BOT attacks. The earliest attacks commenced the attack by compromising buffers on the stack and the heap segments. Later generation attacks attacked such pointers that had the potential to change the execution path of an application There is a need to protect these network accessible hardware clients and the data residing on such clients from various forms of malicious attacks that are facilitated through memory corruption.

A method or corresponding apparatus in an example embodiment of the present invention detects memory corruption of at least one portion of memory at run-time. A method or apparatus using principles of the present invention corrects memory corruption, during run-time, by replacing the at least one portion of memory with a backup of the at least one portion of memory. A method or apparatus also using the principles of the present invention alerts the user of memory corruption where recovery from such memory corruption is not practical.

In an embodiment, the method or apparatus detects a memory corruption by comparing a run-time signature of a program or shared library file with a valid signature during load-time.

In another embodiment, the method or apparatus detects a memory corruption by monitoring program code execution to identify an abnormality.

In an embodiment, the memory corruption may be initiated locally or remotely through a network.

A method or apparatus employing principles of the present invention detects a memory corruption of at least one portion of memory, during run-time, in a Smart Phone, Personal Digital Assistant (PDA), Mainframe Computer, or Personal Computer (PC).

In one embodiment, a process in the present invention identifies an intention to corrupt at least one portion of memory either directly by malicious code or by existing code being manipulated maliciously. In either case, the system intercepts the malicious code, during run-time, to prevent corruption of at least one portion of memory.

In another embodiment, a process of the present invention creates a backup of the at least one portion of memory.

A method or corresponding apparatus in an example embodiment monitors at least one computer instruction during run-time and prevents the execution of the at least one computer instruction, where the location of the next computer instruction to be executed is identified as improper. In an embodiment, the computer program instructions are machine-language code. In another embodiment, the monitored computer instructions include at least the various forms of the return, jump, or call instructions.

In still yet another embodiment, a process in the present invention stores information about stacks, heaps, and machine language instructions, for either an executable, or a shared library that maybe loaded into a hardware client device at start up or during the course of execution of a software application during run time.

A method or apparatus uses a process that creates a database of the computer instructions to be monitored prior to runtime. Next, the process, during run-time, (i) detects a memory corruption of the at least one portion of memory; and (ii) replaces the at least one portion of memory with the backup to correct the memory corruption of at least one portion of memory or determines that it is not possible to recover from the corruption and therefore warns the user and/or terminates the application.

A method or apparatus provides a memory correction service. The memory correction service corrects a memory corruption and receives payment for the correction of the memory corruption.

A novel secure virtual machine approach to detect and mitigate a broad class of memory corruption attacks is employed using embodiments of the present invention. A thin lightweight secure virtual machine that envelops each protected application is used for detecting and mitigating memory corruption. This virtual machine can detect memory corruption on data segments such as the stack, data and the heap segment, and the resulting hijacking of program control flow, by dynamically checking a set of invariants at run-time. Memory corruption exploits cause one or more invariants to become false, leading to the detection of such memory corruption. One approach can (i) detect a broad class of memory corruption attacks, (ii) is lightweight and efficient, (iii) can detect zero day exploits since it does not rely on detecting attacks through signatures, and (iv) works with binary files without requiring application recompilation or on-disk modifications to existing software applications.

An example memory corruption protection technology helps protect businesses and consumers from zero-day worm attacks that exploit memory vulnerabilities. It can protect vulnerable enterprise software applications until a software patch that addresses the vulnerability becomes available. This proactive protection provides the home user or the enterprise user with a larger time window to test patches prior to deployment since there is no danger of the vulnerability being exploited by a malicious hacker. Since mission critical enterprise computers do not need to be updated, rebooted and restarted, there is not only significant increase in productivity in the enterprise but the potential for loss of intellectual property and personal information is also reduced.

Studies have shown that security exploits based on memory corruption such as buffer overflows and arbitrary code execution constitute more than half of today's security vulnerabilities.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 2 shows address space permissions associated with each segment of a computer process address in an example embodiment;

DETAILED DESCRIPTION

Figure 1:
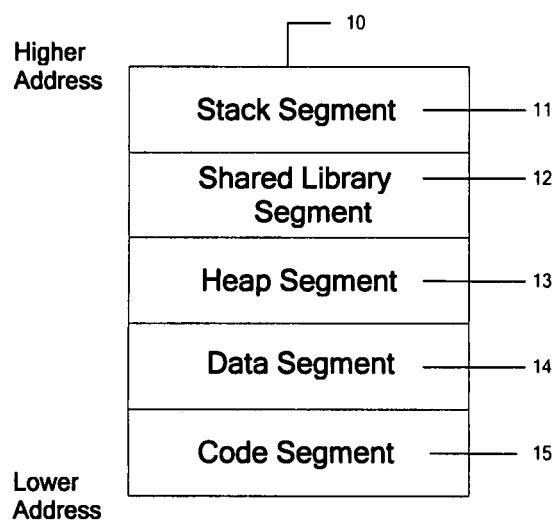
FIG. 1 depicts a segmented address space.

FIG. 1 is a representation of memory that an operating system utilizes for executing a software application. Various sections of memory utilized are collectively called the Process Address space 10. The Process Address space 10 is a combination of the Stack Segment 11, the Shared Library Segment 12, the Heap Segment 13, the Data Segment 14, and the Code Segment 15. Individual functions in a computer application use sections within the Stack Segment 11 for storage and manipulation of their local variables and parameters. When one function calls a second function, the return address into and a pointer to the beginning of the stack subframe used by the first function are saved on the stack subframe of the second function before the second function begins executing. Code contained in libraries is present in the Shared Library segment 12, which may be stored in a shared memory segment.

The Data segment 14 stores initialized global and static variables and is also the repository for many memory subsections such as the Heap segment 13, the Block Started by Symbol (BSS), .idata, .rdata, .edata, and other memory sections. The Heap segment 13 contains the memory used dynamically by the application. The computer's memory manager can allocate, coalesce and free up memory contained in the heap segment 13 of the Process Address space. Garbage collection functionality of the memory manager allows heap segment memory to be used and reused without fear of running out of memory. The BSS segment contains global and static variables that are used by the application without initialization. The .idata section contains references to functions imported by the various modules (individual executables and libraries including shared libraries) that make up the complete software application. Similarly, the .edata section contains references to the functions exported by each module in the software application. The .rdata section is used to store read-only variables like constants used by the application. The code segment 15, also known as the text segment, contains the code used by the executables and modules that make up the software application. In an embodiment, the application uses the various segments of memory described above in different ways. Therefore the access permissions associated with each segment may be different.

FIG. 2 shows the address space permissions associated with each segment of memory in the process address space 10 of FIG. 1. In particular, code segment 21, has read and execute permissions but not write permission. Consequently, the CPU cannot write into the code segment. This security mechanism is enforced by the operating system in order to prevent the application instructions from being corrupted. Data segment 22, Heap Segment 23, and Stack segment 25 have read and write permissions, but should not have execute permission. However, until recently, operating systems did not impose non-executable restrictions on these segments. In an embodiment, a Shared segment 24 is similar to the code segment 21 and has the same permissions since the shared segment is also code of the software application.

Figure 3:
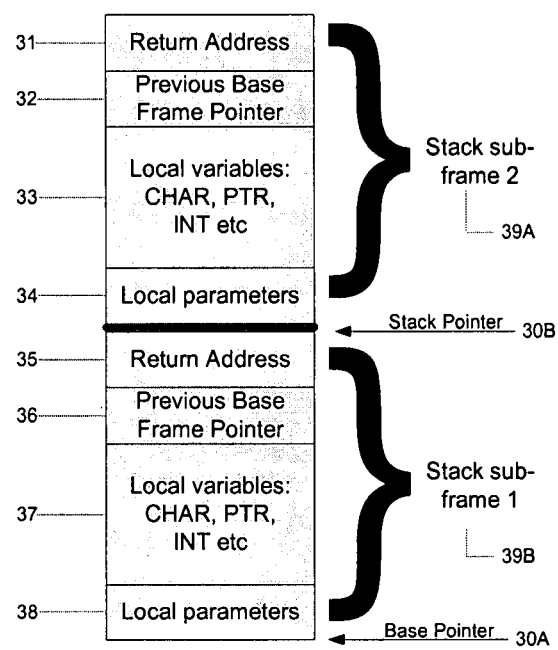
FIG. 3 depicts an organization of stack sub-frames.

FIG. 3 depicts an organization of the stack sub-frames that are created and destroyed as the software application executes. Before an application is ready to be released, it usually is compiled and linked. The compiler inserts a prologue before and an epilogue after each function in the executable and libraries that make up the application. When a typical function in the application, F1( ) for example, executes, the prologue inserts the address of the base of the stack sub-frame, 30A, for that function into the base pointer (BP) register. It then makes room for the local parameters 38 and local variables 37 of the function F1( ) by moving the stack pointer (SP) 30B upwards. The Stack Pointer register is updated with the new location of the stack pointer 30B. Local variables can include integers, characters, arrays, pointers etc that are may be declared by the function F1( ). During the course of execution of code in function F1( ) if F1( ) makes a call to another function, say F2( ), then the epilogue placed by the operating system writes the address of the Base Pointer 30A of function F1( ) into the Previous Base Frame Pointer 36 and the address of the next instruction after the call to F2( ) within F1( ) into the Return Address 35 of the stack Sub-Frame 1 (39B). The operating system also advances the address in the ESP register to allow for the two DWORDS written by it on stack sub-frame 1 (39B). The complete region of memory between locations 30A and 30B is called the Stack Sub-Frame for function F1( ) (39B).

If a malicious hacker finds a function, F2( ), that uses a local buffer as part of local variables 33 or performs pointer arithmetic to write into the stack without checking bounds, the hacker can fill the memory in the stack sub frame of function F2( ), with malicious content. The memory can be filled with data that is in reality a collection of instructions (also known as shell code). The buffer can be overflowed past the local variables 33 and local parameters 34 and as far as into the Return Address 35 as well as the Previous Base Frame Pointer 36. The content placed into 35 and 36 refers to the beginning of the shell code inserted into 33. When Function F2( ) exits, execution is returned to the address in Return Address 35 and that function uses a stack sub-frame whose base is referred to by the overwritten value in 36. Since the contents of 35 and 36 have been written by the malicious hacker, she is able to redirect the execution to an arbitrary location. Using such unauthorized redirection, the hacker can execute arbitrary code with arbitrary parameters.

The attack described above is called the first generation Stack Smashing attack. In the Stack Smashing attack, the shell code is placed directly into the stack sub-frame of a vulnerable function. Upon exit from that function, the execution flow is diverted to the malicious code. These attacks have now been thwarted by recent enhancements such as the No Execute (NX) and Data Execution Prevention (DEP) enhancements announced by major hardware and software vendors. Unfortunately, many software applications stop working with these protection mechanisms which may result in the user to bypass such mechanisms. Once disabled or not enforced, cannot block attacks that use shell code to perform malicious actions. In another embodiment, a first generation can be an "Off By One Attack." Here a few bits of the address in the previous base frame address saved on the previous function's stack sub frame 36 is modified maliciously to point the base of the previous stack sub frame to else where in the stack segment. The software application will then start performing unexpected actions and may even crash.

While blocking shell code is a major stride in containing the spread of viruses and worms, code that is in the process address space can be used maliciously to attack the user's computer including writing files to the user's disk. The NX/DEP support cannot prevent code already present in the user's computer as shared libraries from being manipulated maliciously. A second generation attack known as the return-to-lib-c attack leverages exactly such shared library code to mount attacks on unsuspecting victims. In an embodiment, a return-to-lib-c attack proceeds similarly to the Stack Smashing attack with the difference that there is no requirement to drop shell code into the local buffer. Instead, the local parameters are changed and the return address changed to a shared library function. The maliciously re-written local parameters cause the shared library code to perform malicious activity.

Figure 4:
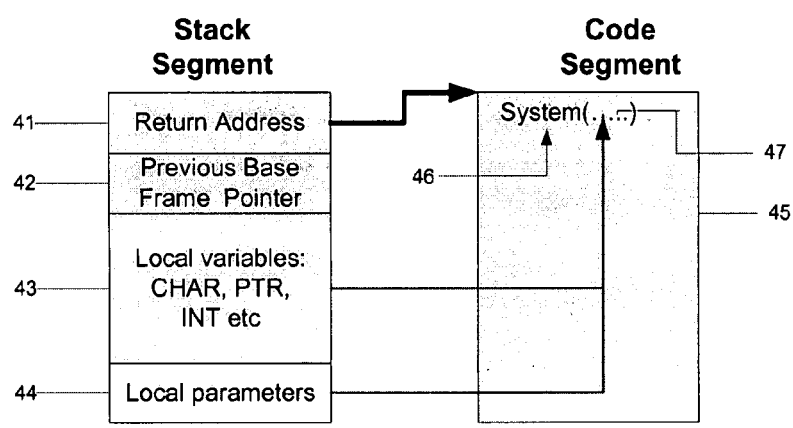
FIG. 4 shows mechanics of a return attack in an example embodiment.

FIG. 4 shows the mechanics of an attack (return-to-lib-c) in an example embodiment. In particular, in FIG. 4 an attacker points the return address 41 to commonly used library functions, such as system( ) 46, already present in the code segment 45. By attacking common library functions such as system( ) it is possible to obtain a shell remotely and perform the actions the targeted library function would perform usually. By supplying this shell with malicious parameters 47 which are loaded using local parameters 44, it is possible to execute an arbitrary shell command, such as deleting specific files or directories.

Both the first and second generation attacks exploits an overflowing buffer to corrupt execution flow control data, namely the return address 41 and the previous base frame pointer 42 in order to bring malicious code into the execution path. A pointer and an exception handler can also be used to redirect code execution to arbitrary locations in the code and data segments. Data that can affect the flow of execution at run time is collectively referred to as execution flow control data hereinafter.

At the time the application is being designed, execution flow control data is liberally sprinkled around in memory by the compiler, the linker and the loader. Exported and imported function pointer data and relocation tables are examples of such execution flow control data sprinkled by the linker etc. Third generation memory corruption attacks have targeted such execution control flow data to bring malicious external or existing code into the execution path. Some of the more popular attacks that maliciously corrupt execution control flow data are the Format String Attack and the heap based FLINK/BLINK Attack. The format string attack can be used even if the programmer uses secure libraries that check the bounds of the buffer being written to.

Figure 5:
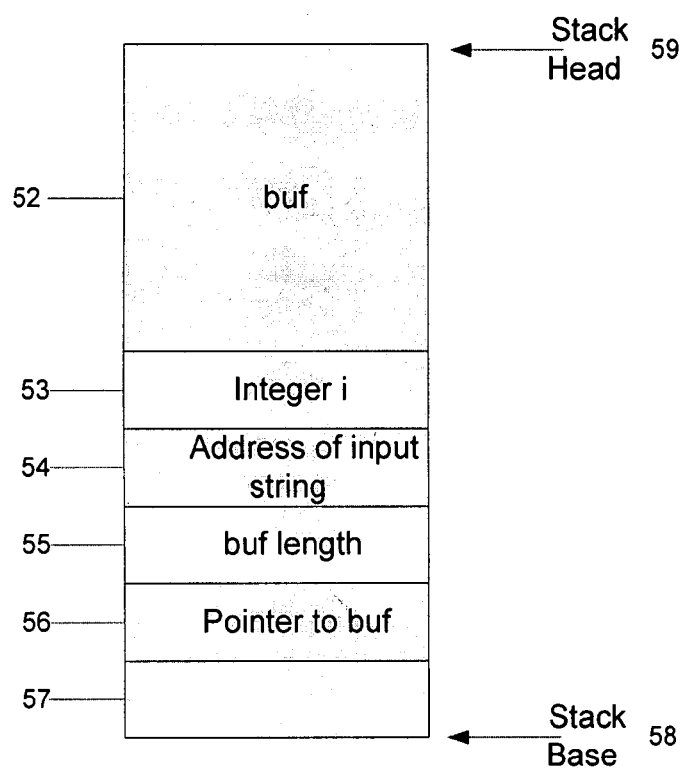
FIG. 5 depicts the mechanics of a format string attack.

FIG. 5 depicts the mechanics of a format string attack. The stack sub frame for function snprintf( ) 51 will appear as shown at Stack Pointer 59 through the Base Pointer 58. If the malicious hacker supplies snprintf( ) 51 with the data "\x85\x86\x23\x77% d % n" that information is stored at the location pointed to by location 54 on the stack of snprintf( ). As the function snprintf( ) executes, the CPU will scan the contents of the input string, one character at a time, and start copying the contents into the bottom of location 52 until the CPU encounters the format string (the % d embedded inside the supplied string). At that point, the CPU advances the stack pointer from 54 so that it points to 53 and prints the contents of 53 in lieu of the % d format string. The CPU next encounters the % n format string in the input string. Once again, it advances the stack pointer which now points to the $1^{st}$ data in 52 which is the address supplied by the input string. This address is 0x77238685 (the first four bytes of the input string read in little endian format). It will then write 5 to this address in lieu of the % n format specifier (because so far 5 characters have been read by the CPU). This mechanism can be used to write an arbitrary value to an arbitrary address. By cleverly manipulating the data supplied to snprintf( ), it is possible to write a series of arbitrary value to a series of arbitrary addresses one byte at a time. In this way, execution flow control data can be maliciously overwritten.

Figure 6:
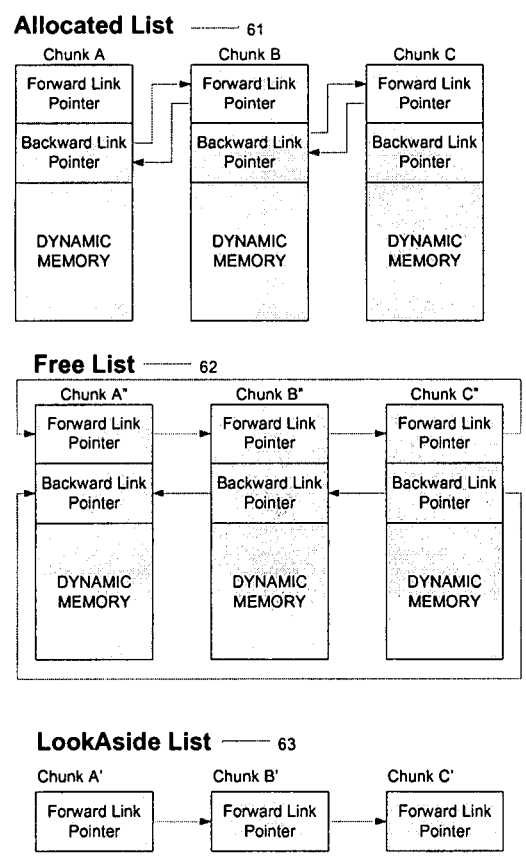
FIG. 6 shows control data structures in a heap allocation unit.

FIG. 6 shows control data structures in a heap allocation unit. When a process starts, a default heap is created. This heap is carved out into small individual chunks which are initially free and chained in to a Free List 62. Each chunk has a header with two pointers called the FLINK (forward link)

and BLINK (backward link) and a data section for dynamic memory storage. As the process executes, free memory is allocated. Allocated list 61 is also similarly chained together. From time to time, as allocated memory gets freed up, it is first returned to the LookAside List 63. Before allocating fresh memory from the Free list, the memory manager looks at the LookAside List 63 for available free memory. This is done to speed new allocation requests by the application and to prevent fragmentation in the remaining memory. Unlike the Allocated List 61 and the Free List 62, the LookAside List 63 is singly chained through the FLINK pointer alone. Unlike the sanity checks performed when memory is returned into the Free List 62, the checks performed for returning memory into the Look Aside List 63 are, in some instances, not as exhaustive. This is a tradeoff between speed and security. As a result less effective error checking, an existing allocated chunk of memory can write arbitrary data on a contiguous free chunk in the LookAside List 63 by supplying the allocation unit with more data than it can hold. When the corrupted free LookAside chunk is later allocated, its FLINK pointer will be pointing, to a destination of a malicious hackers choosing. When the error checking is performed, the maliciously overwritten FLINK location comes into the execution path and execution resume at the address pointed by the FLINK pointer. A subsequent write to the memory completes the attack process and the malicious hacker's objective of subverting the application is accomplished.

Memory exploits arise because it is difficult to distinguish between execution flow control data and ordinary data in segments such as the stack, heap, relocation and data sections of a process running on a computer. Execution flow control data and ordinary data are intermingled by various entities such as the compiler, the linker as well as the loader through the use of return addresses, stack frame pointers, look-up tables, relocation tables, etc. While the code segment of an executable is write protected against malicious changes, execution control flow data present in the stack, heap and data segments, is not immune to malicious changes. A malicious hacker can therefore either deposit arbitrary code into the stack, heap, relocation and data sections of the process address space and either redirect execution to maliciously planted shell code or divert execution to existing code invoked with malicious arguments so that unintended user actions can be performed. These attacks are often facilitated by performing pointer arithmetic on a pointer whose bounds are not checked or by manipulating pointers that are linked either singly or doubly but perform some operation on the stack, heap, relocation and other data sections that hold execution flow control information. A subsequent memory write operation on such a vulnerable pointer allows arbitrary content to be written to arbitrary locations in the stack, heap, or data sections. Once arbitrary writing is completed, the application performs malicious activity without any prompting by the local or remote hacker.

Some of the memory attack-vectors that may exist, include:

1. Stack based buffer overflows that attack control registers like Extended Instruction Pointer (EIP) and Extended Base Pointer (EBP) with the purpose of either diverting execution or providing malicious arguments to existing code in shared libraries or the executable itself.
2. Format String attacks that can be used to write arbitrary content to arbitrary locations. Therefore, these are typically used to overwrite function pointer arguments and divert execution to malicious places in the shared memory segment or even inside the main executable.
3. Heap Based buffer overflows that use dangling pointers or FLINK/BLINK pointers to write malicious content into EIP and EBP. Since these pointers can be used to write arbitrary content to arbitrary locations, they can be exploited with the objective of changing function pointer arguments or even the functions exposed through the shared libraries
4. Double free attacks are similar to heap based buffer overflows. An attempt to free an already freed up memory region can be used to write arbitrary data at arbitrary locations. By choosing a location, such as control data or code execution data, execution can be diverted to arbitrary locations.
5. Integer overflows can be used to bypass bounds checking. For example, if a condition defines an integer to be <512 before some pointer operation is done, then by overflowing the integer, it is easy to force a value of −1 which is less than the 512 number used and this will allow the unsafe operation to proceed.
6. Function and local pointers can be used to hijack and overwrite data structures such as the Imported Address Tables (IAT) or other relocation tables. When the application accesses these tables, the available tainted data causes the application to perform unintended actions.

The Invariant Checking Engine is a run time mechanism that whilst detecting memory corruption reliably does not access source code or perform static analysis to determine permitted states or pointer boundaries. Instead, it relies on imposing fundamental computer architecture principles to reliably detect memory corruption that ends up diverting the natural execution flow model of the application in a way that allows an attacker's code to be executed. The proposed solution is not restricted to detecting memory corruption at one computer, but the detection of corruption in many network computers (including but not limited to fixed computers such as desktops, laptops, servers, workstations, etc. as well as mobile computers such as handhelds, smart phones and personal digital assistants etc and intelligent appliances such as home control systems, alarm systems, sprinkler systems etc). These networked computers can be present in one private enterprise or be a part of a public service provider network.

Figure 7:
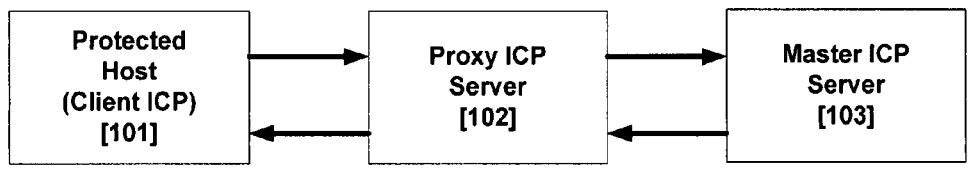
FIG. 7 depicts a block diagram of an Invariant Checking Engine (ICE)

FIG. 7 depicts a block diagram of the Invariant Checking Engine (ICE) infrastructure. The individual hosts that can be protected by the current invention can be a plethora of computers which are individually or collectively referred to as Client ICE 101. An individual computer can be a fixed computer (such as but not limited to a desktop, server, workstation, main frame etc), a mobile computer (such as but not limited to a laptop, handheld, Smart Phone, PDA etc), a wireless computer (such as a cellular, WIFI and WIMAX communication device) or an intelligent appliance (such as a home control system, alarm system, sprinkler system etc). The sub-engines that power the Client ICE 101 are the File Integrity Validation Engine, the Invariant Checking Engine, the Client Vulnerability Logging Engine, the Client Software Update Engine, the Client License Management Engine and lastly the Client Configuration Management Engine. The detailed working of these engines will be described below.

A group of computers, each of which implements the Client ICE 101 can be collectively serviced by one or many Proxy ICE 102. The services available from a Proxy ICE 102 may include but not be limited to updating of the Software Image Update Service, Vulnerability Management Service, File Validation Service, and the License Management Service. More details about some of these services are described later. The Proxy ICE 101 is typically deployed by small, medium or large enterprise or business customers to ensure the above mentioned services offered are in compliance with the overall corporate policies and standards. Computers of individual end users' (e.g., a home users) acting can also be serviced by a Managed Service Provider's Proxy ICE 102. Some other individual end users can obtain such services from a Master ICE 103 directly instead of from the Proxy ICE.

The Master ICE 103 provides all the afore-mentioned services that the Proxy ICE 102 provides. In an embodiment, one major difference between the services offered by the Proxy ICE 102 and the Master ICE 103 is that the latter is the final arbiter and is hierarchically superior. The Master ICE 103 server is typically owned and operated by the organization that owns the present invention and such entity will be referred to as the Owner hereinafter. Since a given Master ICE 103 can handle only a finite number of connection requests from a Proxy ICE 102 and Client ICE 101, many Master ICE 103 servers may need to be deployed as the ICE protection service increases in usage. The task of choosing which Master ICE 103 will service a given incoming connection request from a Proxy ICE 102 or a Client ICE 101 can be done either manually by traffic engineering mechanisms or through an automated connection load balancing server. In an embodiment, it will be assumed that when a Master ICE 103 gets a connection request, it has already been routed to the best possible Master ICE 103 server instance.

Figure 8:
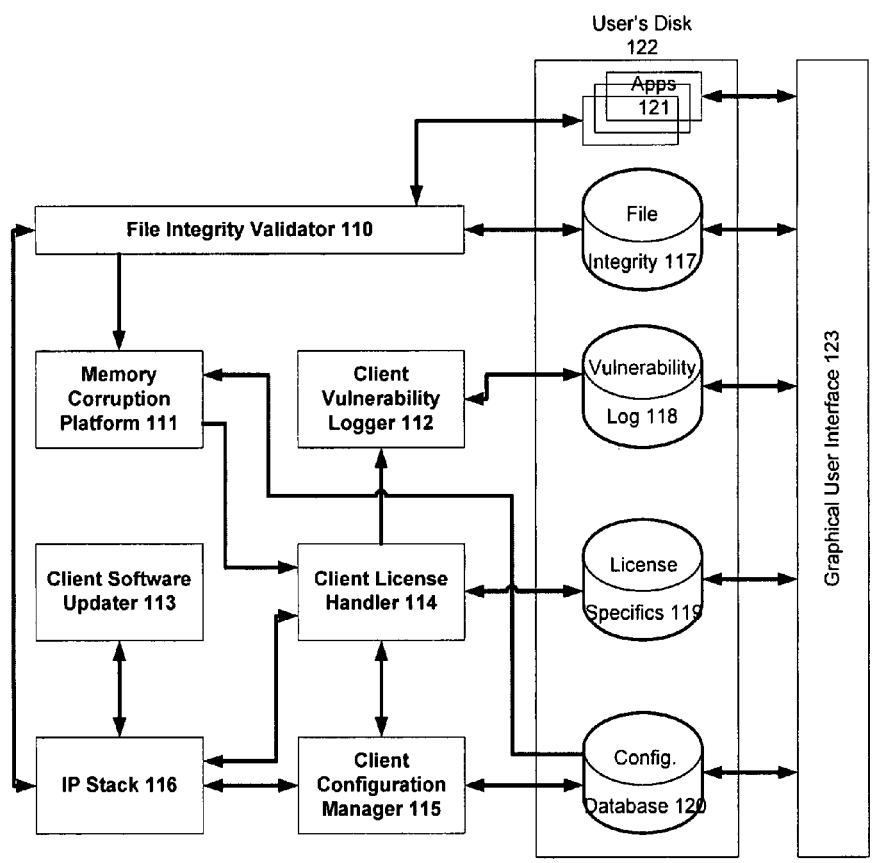
FIG. 8 shows a block level diagram of engines in a Client ICE.

Reference is now made to FIG. 8 that shows the block diagram of the functionality present at each individual host referred to as Client ICE 101 of FIG. 7. The functionality contained in each individual block is as described below.

The Invariant Checking Engine 111 in FIG. 8 provides the basic memory corruption detection functionality by enforcing the Invariant Checking rules that help detect that memory has been corrupted at run time. Once a security breach has occurred and has been detected, the Client Vulnerability Logging Engine 112 of FIG. 8 will not log contextual information into the Vulnerability Log Database 118 and propagates this information to the Enterprise/Managed Service Provider's IT Manager, if any, and also to the owner of the patent so that the new vulnerability can be made public and the attacked module's vendor be informed so that a corrective patch can be released subsequently. The Client Software Update Engine 113 ensures that the software image of the Client ICE 101 of FIG. 7 is the latest image. When the Client ICE software is updated, these changes are propagated to such computers that include an active license. The Client License Handler 114 allows the user of the Client ICE to update the license when the duration of the license has expired. Details of the license are stored in the License database 119. The Client Configuration Manager 115 manages the various configurations parameters that may be useful to run the Client ICE. For example, the IT Manager of an enterprise may determine that some applications may not use Client ICE protection. In this circumstance, it may configure the Client ICE to not protect any process spawned by the said application. The configuration is stored in the Configuration Database 120. The File Validation Engine 110 ensures that the module being loaded from the user's hard disk into the process address space has not been corrupted. This is accomplished by comparing the load time signature of each software module with the golden signature stored in the File Integrity database 117. The user's hard disk 122 stores the software functionality the user requires. The Graphical User Interface 123 is the front end of the Client ICE and provides a mechanism for the user to make changes to the configuration and also to observe the logs.

Figure 9:
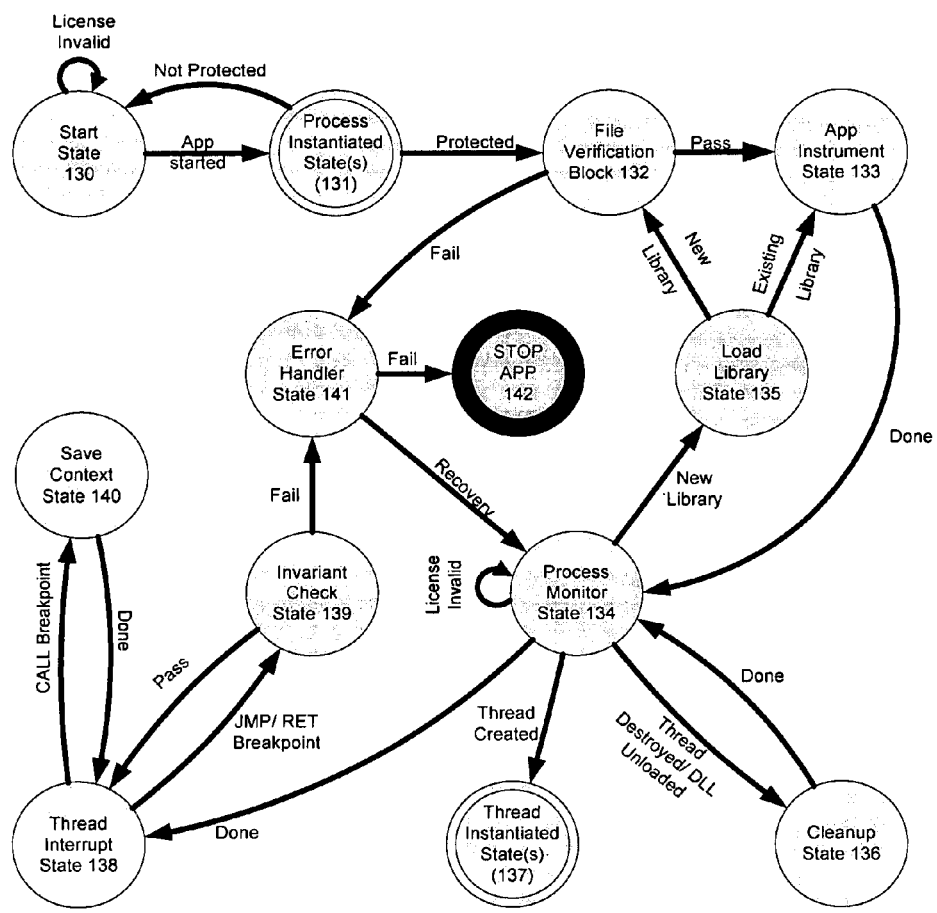
FIG. 9 shows a state machine of a Client ICE.

Reference is now made to FIG. 9 which depicts the detailed functionality of the Invariant Checking engine present in the Client ICE 111. Invariants attempt to detect hijacking of the program control flow by checking the integrity of data segments such as the stack, heap and the import address table. This is achieved by capturing the state of registers and portions of data segments and then checking if this state has been modified by a memory corruption attack. Doing so ensures the integrity of the stack, the heap, the import address table, etc., and prevents hijacking of program control flow by an exploit. A number of invariant checks are triggered at various points during execution.

Return address integrity check: The invariant checks if the return address on the stack matches the address from where the function was called. Failure of the check indicates that the return address was modified after it was placed on the stack due to a possible buffer overflow exploit. The previous frame pointer is similarly verified.

Jump address validation: This invariant checks that a jump instruction transfers control to another location in the code segment. Since data segment such as the stack or the head do not contain code, any attempt to transfer program control flow to a data segment is indicative of an memory corruption exploit and is detected. Note that this invariant check provides protection similar to that provided by the NX bits in hardware, but without having support in hardware (thereby providing such protection on older hardware that lacks this feature).

External Call validation: This invariant verifies that a call to a library function is present in the Import Address Table (IAT) of that segment. The import address table, which is generated by the compiler, contains a list of calls made by the source code to external library functions. An attempt to invoke a library function that is not present in the IAT indicates a hijacking of the control flow, since that function was not present in the original source code and thus would not be invoked during normal execution.

Call destination and Far Jump validation: This invariant checks that a call to a library function in another segment or any far jump into another segment goes to the starting location of a function; an attempt to transfer control into the middle of a function via call or far jump is not allowed. The export table of the segment, which contains a list of exported function and respective start addresses, is used to verify and check this property.

IAT Integrity check: The previous two invariant check use the import and the export address tables of a segment to guarantee that external calls are valid and go to valid memory locations. However, the success of these invariant checks may depend on the integrity of the import and the export address tables. A memory corruption exploit that corrupts and overwrites entries in these tables can defeat the invariant checks. To prevent such exploits, the invariant checker maintains a shadow copy of the import and export tables for the code and linked libraries; the integrity of these segments (or that of particular entries within these tables) are first checked by comparing them to the shadow values; once integrity is verified, then the invariant checks are performed. Together, the integrity and the invariant checks can detect a variety of memory corruption attacks, including DLL bounce attacks, local pointer attacks that attempt to corrupt the IAT, and forms of function pointer and return-to-libc attacks that attempt to invoke a function not present in the IAT.

Heap integrity checks: The notion of invariant checks can be extended to protect the heap from memory corruption. Several invariant checks can be designed to test for heap integrity. As an example, portions of the heap meta-data for each dynamically allocated region (e.g., the so-called flink/blink pointers) can be saved as a shadow copy; alternately a checksum can be saved. This shadow copy or the shadow checksum can be used to verify the integrity of the heap meta-data and detect if the linked-list pointers have been overwritten. These checks are triggered upon heap operations such as heapCreate, heapDestroy, heapAllocate, heapFree, etc.

Library randomization: While invariant checks can prevent some forms of functional pointer attack, they are unable to detect exploits where an overwritten function pointer points to a function that is also used in the code. In an example embodiment, a secure virtual machine can perform address space randomization on linked libraries to prevent attacks; such randomization is done at load time and is transparent to the application. It also does not make modifications to library files on disk. One technique involves loading the library at a different random location on each machine. Further, the original library function names are mangled using a randomizer and a wrapper library to invoke these functions. The wrapper library contains a random permutation of functions present in the original library (thus the functions in the library appear in different order and at different locations/different systems) The wrapper functions invoke the original functions using the mangled function names. Use of random permutations of functions within a library, together with name mangling and loading of the mangled library at a random location, enables thwarting of function pointer and return-to-libc attacks.

This detailed functionality available through the Invariant Checking Engine is described through the state machine that describes the actions performed by the Client ICE 111. In the Start State 130, the Client ICE stops the loader from loading the application into memory and instead brings in the Client ICE libraries into memory. Once these are loaded, and ready to run, the Start State 130 begins operation by examining the details of the license advertised by the host on which the ICE is running. This is done to ensure that the license is valid at the time a protected application is started. In case the license validity has expired or the user is in contravention of a condition implicit in the license, the state machine of the Client ICE does not advance. Due notification of expiry of the Client ICE is made to the user and an invitation to renew the license is also made. On the other hand, if the license is determined to be valid, the Client ICE engine commences the process of protecting the client to the next stage. This functionality may occur in the Process Instantiated State 131 in FIG. 9. In the Process Instantiated State , the Client ICE reads the configuration files from the configuration database 120 in FIG. 8 and determines whether the application should be protected or not. Based on the result of the lookup, the application may or may not need to be protected. In case it is determined that the application does not need to be protected, control of the state machine is transferred to the Start State 130. In either case, the Process Instantiated State signals the loader to start loading the modules that make up the application. However, if the application does need to be protected, the Client ICE state machine advances to the File Verification Block 132. As the operating system loads each module (executables and libraries) required by the application, the Client ICE persists in the File Verification Block 132. When no more new modules need to be loaded, the File Verification Block 132 passes control to the App Instrument State 133. During run time, some libraries or executable may need to be loaded into memory. At that time, control may need to be passed back to the File Verification Block 132. The File Verification block examines each module and computes a hash of the code segment and compares it with at least two instances having a golden hash stored for that executable in the File Integrity database 117. In case the run time computed hash does not coincide with the stored at least two instances having good hashes, the file integrity test will be deemed to have failed and the state machine is advanced to the error handler state 141 for further processing. Alternatively, if the file integrity test passes, control of the state machine is transferred to the App Instrument State 133.

When an executable file is loaded into memory, it is possible to read the data structures associated with that file and determine information about the organization of the file. In one embodiment, of the operating system, the file format of choice is the PE File format in which data structures contain information about the size and the beginning location of the various sections such as the code section, the data section, the exported and imported functions etc for that file. By analyzing the information contained in these data structures, it is possible to perform at least two instances of run time checks that can lead to the detection of a memory corruption attack. In the App Instrument State 133, such invariant information is extracted from the data structures buried into the executable or library. In another embodiment, an operating system uses the COFF File Format and similar invariant information can be extracted from the COFF format as well. Some commonly used shared library modules which are leveraged by many executables such as but not limited to the C-Run time libraries are easy targets for malicious hackers since they are highly likely to be present in the process address space of a target. Therefore, such common modules may need to be swapped out and instead functionally identical but randomized versions of the module may need to be brought into memory instead. This throws off malicious hackers since many functions they leverage are not present at the locations they expected such functions to be in. As the next step, the state machine of the App Instrument State 133 converts the machine code of the file being loaded in memory, into assembly code. This activity is performed using a dis-assembler. Once the dis-assembler has been used to read the object code, the machine code is now readable (e.g., in a form humans can read) in the form of Assembly Language artifacts. Now, each of the instructions that can affect the execution control flow of an application to change, such as but not limited to the JMP, CALL and RET in the case of the x86 hardware architecture embodiment, are identified and instrumented by replacing them with special instructions that will cause that computer's CPU to be interrupted by software or hardware. Some examples of such replacement instructions include the UD2 Opcode or the Software Break-Point 0xCC Opcode in the x 86 hardware architecture embodiments. Similar instructions in non-x86 architectures can be utilized for the substitution.

As mentioned earlier, the data structures associated with the object code of the file being currently instrumented are parsed to determine the following.

1) The address bounds of the code section and the data section of each module. Once this list is prepared, at run time, the Client ICE can precisely determine the module of which a given instruction is a part. This fact will be used to constrain the next destination in the execution control flow of the application.
2) A list of each of the functions imported and exported by a given module as well as the entry points of the exported functions is created on a per module basis. This information along with the start and end addresses of each module help to constrain the next destination from a given instruction.

With the aforementioned information being available, it is possible to perform the following additional steps:

1) Machine language in the code sections of each module in the application can be translated into its assembly representation in memory. A list of each assembly instruction on which invariant interrupts have to be applied can be maintained on a per module basis as well as on a per application basis. This invariant interrupt list includes but is not limited to the Opcodes of the original instruction, the address of the replaced instruction in the module, the type of instruction (such as CALL, RET, JMP, in the case of the x86 hardware architecture embodiment of this invention as well as function entry points in shared libraries such as HEAP_ALLOCATE, HEAP_FREE etc). This invariant interrupt list will be used at run time to cause controlled execution of the original instruction.

2) A shadow copy of the imported and exported functions names and their target addresses can be extracted on a per module basis as well as on a per application basis.

3) A list of each of the modules whose code section is present in the protected process address space is created with name, major and minor versions. Amongst other uses, this list helps with leveraging the instrumented versions of modules such as commonly used shared libraries for other processes that may also instrument the same module in its own address space. Consequently, the App Instrument State 133 may obtain a stored but instrumented copy of the appropriate module. Using a stored copy helps in increasing the efficiency of the instrumentation process.

4) A list of all threads used in the process. This list is used to track a contextual execution flow of individual threads. Therefore, calls to functions and returns from functions are tracked on a per thread basis rather than on a per process basis. As threads get created and destroyed at run time, this list of threads will increase or shrink as indicated by the application.

In an embodiment, the abovementioned steps are performed for each module to be loaded and protected by the software application. Once the aforementioned steps for each module in the address space have run to completion, the Client ICE state machine is advanced from the App Instrument State to the Process Monitor State 134 in FIG. 9.

In the Process Monitor State 134, the Client ICE monitors the software application process for events that can potentially introduce or change the locations of instructions that affect execution flow control. These events can include loading/unloading of libraries, creation or destruction of threads etc. Periodic monitoring of the License is also done in this state. If the License period has been invalidated, a due notice is provided to the user to back up their work and restart the application and a timeout period starts. On expiry of the timeout period, control is transferred to the Cleanup State 136 and the Client ICE exits after informing the user. If the license continues to be valid, as and when invariant interrupted instructions are encountered during application execution, further processing will be done in the Thread Interrupt State 138. When a library, such as a shared library, is loaded at run time, the Process Monitor State transfers control to the Load Library State 135 in FIG. 9. In the Load Library State 135, the ICE examines if the new module is already present in instrumented condition in the memory of another process. If so, the instrumented module can be brought into the address space of the current process and control turned over to the Application Instrument State 133 to enable reading of the relevant data structures (code sections, data sections, exported function lists etc) as well as for the instrumentation of instructions that can result in affecting execution flow of the application. Considering that a newly loaded module could already have been instrumented, the step of looking for it in another process's memory can also be done to shorten the start up time and thereby increase the overall efficiency of the Client ICE protection. Control is transferred first to the File Verification Block 132 to ensure that the module being loaded has not been corrupted while it was on the disk and then the module can be instrumented in the App Instrument State 133. Upon completion of the instrumentation, control of the state machine reverts back to the Process Monitor state 134. In an embodiment, another action performed in the Process Monitor State 134 is that when a module is to be removed from the process address space, the invariant information for that module can be removed in the Cleanup State 136 in FIG. 9. Once the module's invariant information has been cleaned up, control is returned to the Process Monitor State 134.

In the Cleanup State 136, the instrumented instructions and other data structures such as pointers to code section of the given module can be removed from the linked list of the instrumented instructions. For example, if a module is removed from the process address space, the linked list for code section of the entire process address is updated so that it reflects the changed layout of the address space.

In a Thread Instantiated State 137, when a new thread is created contextual information for each thread is saved for later use in the Invariant Check states 139 in FIG. 9. While many mechanisms can be used to create last in first out (LIFO) storage for the contextual information, one embodiment of such storage can be a stack. Therefore, when a new thread is created as determined by the Process Monitor State 134 above, a Local Call Stack per thread is also created by the Thread Instantiated State 137. This Local Call Stack stores important information from the stack of a function such as the address to return to when the CPU wishes to return to the caller function, the base of the previous stack frame in the caller function, parameters used by the function and the base of the current stack's frame. As more functions are encountered and their stack sub-frames created, the abovementioned Local Call Stack data structure for each function in a given thread can be placed on top of the said Local Call Stack. This stack helps maintain a sequence of such function calls in the same order in which the function calls were made in that thread.

From time to time, the code in each thread can be interrupted, either by hardware or by software when an invariant instrumented instruction is encountered. When such an interrupt is encountered, the Process Monitor State advances to the Thread Interrupt State 138 of FIG. 9. In this state further action that may be taken on the basis of the thread ID and the instruction originally present at the address at which the interruption occurred, will be determined. The details of the types of instructions at which the invariant interrupt can occur are listed later. After appropriate but specific contextual invariant checks associated with the interrupted instruction are performed, the Thread Interrupt state replaces the instrumented instruction with the actual instruction, and causes only the said invariant interrupted instruction to be executed. For this single step execution to occur the instruction pipeline should be flushed and the CPU of the computer should be put in the single step mode using the control registers that are specifically embedded in the hardware by hardware vendors for debugging purposes. After the original instruction is executed, the CPU is interrupted once again as a result of operating in single step mode. Some more invariant interrupt checks can be performed In addition, the original instruction is once again replaced with the invariant interrupt instruction Opcode and the single step register flag is cleared. This is done so that if this thread or another thread is using the same code freshly or recursively, it should also be interrupted at each time the invariant instrumented instruction is encountered. Once the single step mode is cleared, the CPU starts operating normally until a new interrupt is taken by another invariant instrumented instruction or when some other condition such as the creation or destruction of a thread, or use of a heap library function, loading of a new module into the memory or unloading of an existing module from memory occurs.

When the processor is interrupted in the Thread Interrupt State 138, if the original instruction at that location was a CALL instruction, control is transferred to the Save Context State 140 in FIG. 9. Here, the address to return to after the Callee function exits, as well as the base address of the previous stack sub frame, local parameters, the current frame's base address and a copy of contents of each of the registers are pushed on to the appropriate Local Call Stack for the thread, created in the Thread Instantiated State 137. The local parameters are saved so as to attempt a stack recovery if stack was detected to have been corrupted. The steps required for recovering the stack are explained later. Once the aforementioned information is saved, control is returned back to the Thread Interrupt State 138 so that additional Invariant Checks can be performed. If the original instruction type is not a CALL instruction but is instead a Heap Allocation instruction, the forward and backward link pointers, the start and end address of the allocation unit being allocated, copy of the contents of each of the registers are saved in a data structure and placed into a linked list for the thread in whose context the interrupt occurred.

As mentioned previously, based on the original instruction type at the invariant interrupted instruction, different invariant checks may need to be performed in the Invariant Check State 139. Some invariant interrupted instructions cause control flow to change so that instructions at a different location start executing. Some examples of such transfer are the CALL or JMP instruction in the case of the x86 embodiment of the work in this patent. Other instructions cause control flow to be returned back to a different location from which control was initially transferred earlier. An example of this instruction type is the RET instruction in the case of the x86 embodiment. Yet other instructions are of the type HEAP_ALLOCATE or HEAP_FREE library functions.

If the original instruction at which the invariant interrupt occurred causes execution flow to change, it should be determined if the instruction is a NEAR transfer or a FAR transfer instruction. In the x86 CPU embodiment, such invariant interrupted instructions could be the CALL and the JMP family of instructions. NEAR transfer instructions are those instructions where execution flow changes from one code page to elsewhere on the same code page. A FAR transfer is one where execution control is changed from a page in the code section to another page in the code section. If the interrupted instruction is about to make a FAR transfer as evidenced from the destination address (after due parsing of the destination address), then if the original instruction type was CALL the Invariant Check State 139 examines if the destination is 1) in the code section of any one of the modules loaded in the process; 2) if the destination address is in the list of functions exported by the destination module using the data structures described above; and 3) if the destination address is in the imported address table of the module in which the interrupted instruction is. and, 4) if the destination address is in the beginning of a instruction block in same module's code section An instruction block is spatially defined as starting from the next instruction after an execution flow control instruction but excluding empty instructions such as NOP and ending at the next execution flow control instruction. If any of these four checks return a failure, then a destination memory corruption security breach shall be declared. If on the other hand, the checks pass, state machine control is temporarily transferred to the Save Context State 140 where the current function context specific information collected for the CALL instruction is pushed on top of a thread specific local call stack (which was created in the Thread Instantiated State) and control of the state machine reverted back to the Thread Interrupt State 138. If the invariant interrupted instruction in the Thread Interrupt State 138 was a JMP family type instruction instead of a CALL type instruction, the Invariant Check State 139 examines if the destination of the JMP family of instructions is in the code section of any other module loaded in the process. If this check does not pass, a destination memory corruption is declared. Once the above is done, control is returned back to the Thread Interrupt State 138.

If the invariant interrupted instruction such as the RET instruction in the x86 embodiment is the last instruction of a function, then the address to return to, can be obtained from the contents of the Instruction Pointer and the base of the previous function's stack sub frame can be obtained by dereferencing the contents of the Base Pointer register in the case of the x86 embodiment. The base of the current frame's stack frame can be read from the current content of the Base Pointer register. In an embodiment, the address of the current values of the return address and the previous function's stack's base frame address should be effectively identical to the similar information saved at an earlier time when the CALL instruction context described earlier was saved in that thread's local call stack. In order to perform the comparison, the first step involves determining which saved CALL context previously saved on the thread's Call Stack, should be compared. For determining this, the first data structure at the top of the stack is popped out. If the current base address of the stack frame and the same information obtained from the saved data structure in the thread's local call stack does not match, then the popped data structure is rejected and the next one popped out from the thread's local call stack. The procedure associated with the comparison of base frame address outlined above is repeated until either the thread's local call stack becomes empty or a match is found. If a match is found before the thread local call stack becomes empty, then a further detailed comparison can be made to determine if the remaining individual elements in the data structure also compare favorably. For this the current return address and saved return address are compared. If these parameters also match, then the previous frame address is compared. If the return address information does not match, a return address memory corruption is declared. If the configuration files indicate recovery of stack should be attempted before the process associated with this application is aborted, recovery of the stack can be attempted. On the other hand, if the previous frame address comparison matches, then no stack based memory corruption has occurred and the application can continue running towards the next invariant instrumented instruction. If however, the previous frame's comparison fails, then a previous frame memory corruption is declared. If the configuration files indicate recovery of stack should be attempted for this software application before the process is aborted, that operation can be performed now. If the saved CALL and current RET contexts match then the last CALL context which was used in the comparison should be popped off the thread's local call stack so that the next CALL/RET matching of contexts can take place.

In the Invariant Check State 139, recovery of a corrupted stack can be done in some cases. In an embodiment, if the parameters of the caller function at the time of the CALL and RET instruction are identical, but the return address and/or the base frame address is not then the caller function frame's stack can be recovered. This is done by loading the saved return address and/or the saved base frame address and other general purpose registers. Once a stack frame has been restored, a message can be posted into the Status Log 121.

If the interrupted instruction is of the HEAP_FREE library call type (i.e., access to the Heap Libraries), then a look up is performed against the saved linked list of heap data structures saved in the Save Context State 140. To determine which record in the linked list are to be compared, the start address of the block of memory being freed is compared with similar information present in individual records of the members of the linked list. If a matching record is found, then a deeper level of comparison is made for individual members of the matching record in the data structure. If the forward and/or backward pointers or the allocation size do not match, then a Heap Pointer memory corruption attack is declared. An attempt to recover the heap can be made. If the size of the allocation unit does not match as evidenced by the failure of comparison between the saved end address, and the size of the current allocation unit, a Heap Size memory corruption attack can be declared. Once again, heap recovery can be attempted. If however, no record with the saved start address can be found in the thread's heap linked list, then a Heap Allocation Memory corruption is declared and no attempt to recover the heap allocation unit can be made.

In an embodiment, the contents of a heap allocation being freed are not relevant. Based on the saved forward and backward pointers and allocation size saved in the Save Context State 140 recovery is attempted and a log message posted into the Status Log 121.

When the Invariant Check State 139 determines that a security breach has occurred or when recovery from memory corruption has occurred successfully, control is transferred to the Error Handler State 141 in FIG. 9. In case recovery from the corruption of a thread's stack is possible, the Error Handler 141 writes a log message into the Vulnerability Log Database 118 and transfers control to the Process Monitor State 134. However, if recovery is not possible, then the Error Handler 141 writes a log message into the Vulnerability Log database 118 and transfers control to the Stop State 142 of FIG. 9.

When control is transferred to the Stop State 142, the breached process is terminated and a user and/or IT Manager is notified. The user or the IT manager will have the ability to inspect the Vulnerability Log Database 118 and obtain the details of the module and the instruction address at which the security breach took place. The specifics of what type of security breach occurred will also be available from the Vulnerability Log database 118. When stack recovery cannot be attempted, the state machine advances in the STOP APP state 142 and a message posted to the user. When the user terminates the application, the state machine advances into the STOP APP state and performs various housekeeping operations such as releasing the memory resources, logging actions before the application exits.

Figure 10:
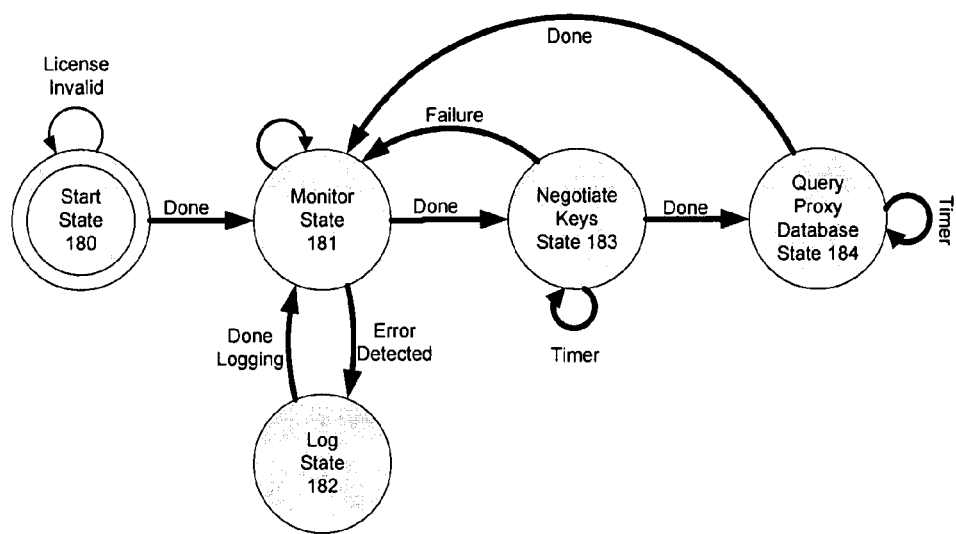
FIG. 10 depicts a state machine of a Vulnerability Logging Engine in a Client ICE.

Once a security breach has occurred and been identified, the Client Vulnerability Logging Engine 112 in FIG. 8 causes contextual information to be logged locally and also causes the information to be propagated to the Enterprise/Managed Service Provider's IT Manager, if any, and also to the IT Manager of the owner of this patent's commercial Master ICE servers so that the new vulnerability can be made public and the attacked module's vendor be informed so that a corrective patch can be released. Reference is now made to FIG. 10.

FIG. 10 depicts a state machine of a Vulnerability Logging Engine in a Client ICE. In an embodiment, the state machine wakes up in the Start State 180 and performs initialization and also checks the status of the license. If the Client ICE License is invalid, then nothing further is done. If the license is valid, the control is transferred to the Monitor State 181.

The state machine continues in the Monitor State 181 until it is interrupted by a security breach as described above. When a breach is observed, control is transferred to the Log State 182. Once the vulnerability is recorded, then a secure communication channel is attempted to be established so that the details of the vulnerability can be communicated to the IT Manager of the Proxy ICE as well as for onward propagation to the IT Manager of the Master ICE server.

As mentioned earlier, when the Invariant engine of FIG. 8 determines that memory has been breached, the details of the vulnerability are written into the local Client's Vulnerability Database 118. That action is performed in the Log State 182. Once the database is updated, a flag is set up in the database to indicate that this record is to be uploaded to the Proxy ICE 102 and then control is transferred back to Monitor State 181 so that the information about this vulnerability can be propagated to the Proxy ICE or the Master ICE server.

For this purpose, control is transferred to the Negotiate Keys State 183 where the task of establishing the secure channel is done. In the Negotiate Keys State 183, two-way authentication is performed with the Proxy ICE 102 or the Master ICE 103. Existing authentication mechanisms such as asymmetric keying instances of RSA1024 or Diffie-Hellman 1024 can be used to establish encryption and decryption session keys. If the latter set of keys can be established in a reasonable time period, control is transferred to the Query Proxy Database State 184, otherwise; control is passed back to the Monitor State 181.

In the Query Proxy Database State 184, the details of the vulnerability detected at the Client ICE are sent to the Proxy ICE 102 or to the Master ICE 103 if the Client is connected to a Master ICE directly. The remote end may reply that it is already aware of the vulnerability or it may confirm that vulnerability is a fresh vulnerability and not one that has been identified previously. In either case, control is returned to the Monitor State 181 and the database flag for the vulnerability, as described above, is cleared. If the remote end does not respond in a reasonable time, the state machine advances to the Monitor State 181 without clearing the flag in the vulnerability database. In case a previous attempt to write the vulnerability information into the remote ICE servers has failed, the Monitor State 181 can wake up on a timer and attempt to write the vulnerability again. For this purpose, the Monitor State checks the Vulnerability Database for the presence of a record where the flag described earlier has not been cleared.

Figure 11:
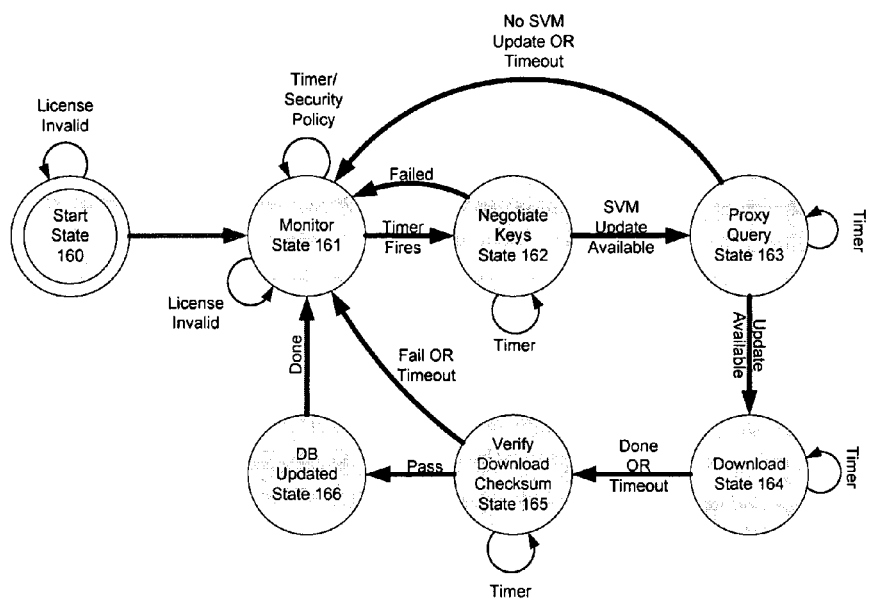
FIG. 11 depicts a state machine of a Software Update Engine of the Client ICE.

FIG. 11 depicts a state machine of the Software Update Engine 113 of the Client ICE 101. In particular, the state machine described below is used to update the software that powers the various engines that make up the Client ICE 101 solution.

The Client Software Update Engine 113 of FIG. 8 regularly polls a Proxy ICE 102 or if connected to the Master ICE 103, polls the Master ICE server and determines if any engine other Client ICE Engines 110 through 115 of FIG. 8 of the Client ICE solution has been updated by the Owner recently. In an embodiment, the process takes place as follows:

At start up, the Start State 160 of FIG. 11 performs initialization and transfers control to the Monitor State 161 in case the Client ICE 101 license is valid. In case the license is not valid, nothing further needs to be done. If the license is valid, the state machine advances into the Monitor State 161.

Periodically, control is transferred from the Monitor state 161 to the Proxy Query State 163 to obtain latest copy of any Client ICE 101 sub-engines (Engines 110 to 115) that have been updated by the Owner. In order to get the new code, the Monitor State 161 first establishes a secure connection with the remote Proxy 102/Master 103 ICE that services this Client ICE 101 instance.

In the Negotiate Keys State 162, a secure channel needs to be established between the Client ICE 101 and remote ICE for the images to be downloaded. This is accomplished by using appropriate authentication mechanisms such as but not limited to RSA-1024 asymmetric key exchange. Session keys for the connection are obtained using standard security protocols such as but not limited to AES-256, 3DES etc. Once a secure channel is spawned, control is transferred to the Proxy Query State 163. If a secure channel cannot be established in a reasonable time, control of the state machine reverts back to the Monitor State 161.

In the Proxy Query State of Client Software Updater 163, the Proxy ICE 102 determines the current versions of the engines that make up the Client ICE 101 through a secure messaging channel setup earlier. If an updated version of the Client ICE software image exists on the remote ICE then control of the state machine in FIG. 11 is transferred to the Download State 164. If no updated image exists, control is transferred back to the Monitor State 161. If the query response from the remote end is not received in a reasonable time frame, the timer on the Proxy Query state reverts state machine control to the Monitor State.

In the Download State 164, the software from the Proxy ICE 102 is transmitted to the Client ICE 101 using secure file transfer mechanisms such as but not limited to SFTP, etc. Once file transfer is completed, control is transferred to Verify Download Checksum State 165. If the download does not complete in a reasonable time, the timer in the download state causes the state machine to advance into the Verify Download Checksum state 165 with an error condition.

In the Verify Download Checksum State 165, a digital signature, such as but not limited to an MD5 hash for the downloaded file can be computed at the receiving end and compared to the same information provided by the transmitting end point. If the comparison is not successful, control is returned to the Monitor State 161. If the download state 164 had been unsuccessful in completing the download, the Verify Download Checksum state 165 conveys the failure to the Monitor state by transferring control to it rather than the DB Updated State 166. However if the verification is successful, then control of the state machine is transferred from the Verify Download Checksum State 165 to the DB Updated State 166. When the Client ICE engines attach to a new process, the appropriate engine will use the new image file that has just been downloaded. Once the above mentioned actions are completed, control is transferred back to the Monitor State 161. The current individual and composite images for each of the Client ICE engines are now saved in the File Integrity Database 117 and the version numbers of the various Client ICE engines is updated in the said database. This is done so as to prevent the Monitor State 161 from attempting to download the new code for Client ICE sub-engines again.

In case the Invariant Checking engine of FIG. 9 had determined that vulnerability existed in a third party software or library module, the Software Update Engine of FIG. 11 can attempt to obtain an updated copy of the said module via the Proxy/Master ICE. This can be done if the software manufacturer has indicated that the module is not encumbered by its own license. To update third party code, a process similar to the process of updating Client ICE sub-engines described above takes place. Many software vendors have their own software update engines but some others do not. Instead of looking for software images of the Client ICE engines, this time, a request is made to the Proxy ICE 102 to update a third party module which has been found to be vulnerable as described above. If an unencumbered but updated version the software image of a third party vulnerable module, is present on in the Proxy ICE 102, that file can be securely transferred to the Client ICE 101 as described above. One caveat in the secure transfer is the security policy followed by the organization operating the Proxy ICE 102. In the case of an enterprise or managed service deployment, the IT organization may not permit downloading an updated version of the vulnerable module arbitrarily without first subjecting the new module to compatibility tests. In that scenario, reference to the security policy stored in the Configuration Database 120 is made in the Monitor State 161. If the security policy disallows downloading an updated version of a vulnerable module, then the Client ICE 101 will not establish a connection with the Proxy ICE 102 to download a non-vulnerable application module. Once a downloaded file is successfully downloaded, the information is made available in the File Integrity database. When an older version of the file is being loaded into memory, the user can be warned of the presence of the newer version. If the user wishes to load the later version, the File Verification Block 132 of FIG. 8 can remove the older module from memory and load the newer, less vulnerable version of the same module into memory.

Figure 12:
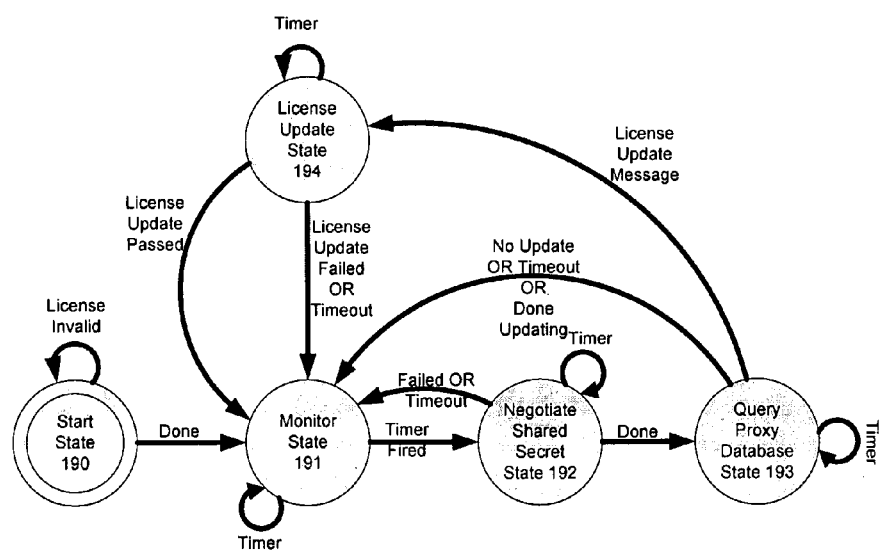
FIG. 12 depicts a state machine of the License Management Engine of the Client ICE.

FIG. 12 depicts a state machine of the License Management Engine of the Client ICE. The state machine provides functionality for handling licensing update requests. The Client License Handler 114 functionality wakes up in the Start State 190. After relevant variables are initialized, details of the License are examined. If the license is expired, nothing further is to be done. If however the license is valid, control is transferred to the Monitor State 191.

In the Monitor State 191, a timer fires periodically or when a predetermined (including but not limited to say 3 weeks before the license is set to expire) event happens. In either case, the Monitor State 191 attempts to establish a secure communication channel with the configured proxy server in order to trigger the renewal of the Client ICE license.

In the Negotiate Shared Secret State 192, the state machine establishes communication with the Proxy Server using asymmetric keys exchange mechanisms such as but not limited to RSA 1024 or DH 1024 protocols. Once a shared secret has been established, control is transferred to Query Proxy Database State 193. If the negotiation is unsuccessful in a preset time, failure notification is sent to the Monitor State 191 and its timer is placed in Snooze mode so that it can be woken up shortly again In the Query Proxy Database State 193, if the Proxy Server returns an updated License then control is transferred to the License Update State 194. However, if a license cannot be delivered for whatever reasons, control is returned to the Monitor State 191 and the timer is armed again so that the process of obtaining a license can be resumed. If however, a timeout failure occurs, the timer for the Monitor State 191 is placed in the snooze mode so that the above mentioned states are activated shortly once more.

In the License Update State 194, the details of the license including its validity are updated and reference is made to the user. If the user agrees to purchase the license, after due payment is made the License Database is updated and control is returned back to the Monitor State 191. If the update process is not successful or if the operation is not concluded in timeout duration, then the timer for the Monitor State 191 is put into snooze mode so that it can repeat the aforementioned operation once again. Even if the License is invalid, if the Proxy ICE 102 requests communication, the Start State 190 will transfer control to the Monitor State 191. The Proxy ICE 102 may need to do so to push down a new license to the Client ICE 101.

Figure 13:
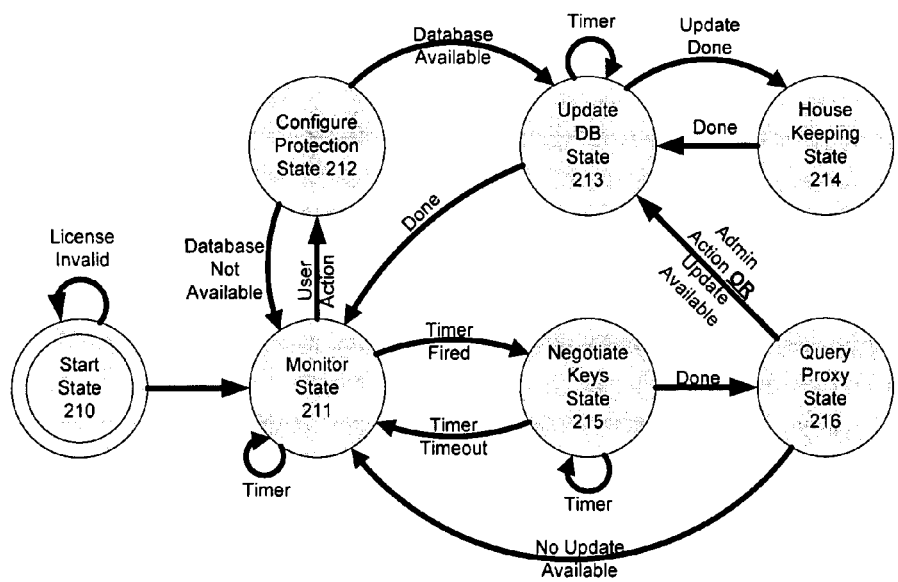
FIG. 13 is state machine diagram of the Configuration Management Engine of the Client ICE.

Reference is now made to the Client Configuration Manager 115 of FIG. 8. The functionality in this block is described in FIG. 13. FIG. 13 is state machine diagram that shows various options allowing a user to read or update the configuration. This block ensures that the Client ICE is updated with changes to the administrative changes and security policy of the enterprise or ISP. The following sections describe the functionality that is provided by the Client Configuration Manager 115

In an embodiment, the IT Admin or the user may decide that the benefits of not protecting a given application outweigh the performance impact of protecting the application. In such a scenario, ICE protection for that application will be disabled automatically. Such a change to client configuration can be made asynchronously at any time. The Client Configuration Manager provides means to make this change.

Periodically, the CPU in the user's machine may be under sustained heavy load or the IT Admin/User may decide that they would like to change the mode of operation of the Client ICE and operate with minimal performance impact. In that scenario, the protection of the Client ICE 101 will switch to a "Stripped Down" mode where only a few modules are instrumented. Which modules to instrument can be decided by looking up the Configuration Database 120 where a given module's vulnerability history will dictates its susceptibility to being attacked. The susceptibility threshold can be progressively raised if the CPU of the protected computer is busy. In the normal course, by default, the Client ICE 101 operates in a "Full Feature" mode where each of the modules in the Process Address space is instrumented. The Client Configuration Manager provides means to make this change.

Some of the mechanisms described in the Invariant Checking Engine of FIG. 9 can result in the Client ICE effecting recovery from memory corruption. However, the recovery may or may not be desirable in the eyes of the IT Admin/User and therefore the default behavior of automatically effecting recovery can be disabled on demand by the user or the IT Manager, on a per software application basis. The Client Configuration Manager provides means to make this change.

When memory corruption is detected, some of the details can be overwhelming for the user—especially those that are not computer savvy. The level of verbosity of the report may be "tuned" for the sensibilities of the user. The IT Admin/User can use the Client Configuration Manager to change the default behavior.

The IT Admin/User may choose between different versions and modes of licenses. The choice of versions could be but not limited to:

1) A "floating" license—one where a pool of users are protected instead of individual users being protected. The Client License Handler 114 obtains a license for the duration that a user is connected;
2) A "fixed" license—one where the user is protected for a certain predefined duration; and
3) A "pay-per-incident" license—one where the user pays only when a memory corruption attack is detected and verified by third party Vulnerability Databases, such as but not limited to US CERT, NVD database, etc.

The choices of modes could be but not limited to:

1) Personal Mode—This represents a typical home based End User situation. The administrative/configuration actions described above are performed by the User rather than the IT Manager;
2) Enterprise Mode—This represents a typical Enterprise User situation. In this mode, most security policy decisions are made by the IT Admin rather than the user; and
3) Managed Mode—This represents a typical home user who is using the Client ICE 101 protection offered by a Security Service Provider such as but not limited to their Internet Service Provider (ISP).

The Client Configuration Manager allows the user/IT manager to make changes to the version and mode. For maintenance, the user can update/change the passwords or update certificates that are used in "User Mode" or "Enterprise/Managed Mode" as described above. Also, the Proxy ICE 102 may wish to perform some maintenance in which case it sets a flag using communication protocols like SNMP. If the Client Configuration Manager detects such flag being set, it asynchronously communicates with the Proxy ICE 102 which makes changes appropriately. This communication needs to be initiated by the Client so that requests for update to the Proxy can be staged.

Referring back to FIG. 13, the state machine provides the Client Configuration functionality described above. In the Start State 210, the existing license stored on the Client computer is read and its validity examined. If the license is invalid, the state machine stays in the Start State 210. If the user license is valid, then after due initialization, control is transferred to the Monitor State 211.

In the Monitor State 211, based on the mode of the license, admin/configuration changes can be examined. Upon expiry of a timer, the status of changes to each configuration parameter is examined. If changes to the Configuration Database 120 of FIG. 8 are detected, then if the Client ICE is running in "Enterprise Mode" or "Managed Mode", a secure channel for communicating with a Proxy ICE is established. For this purpose, control is passed to the Negotiate Keys State 215.

When the Client ICE is running in "User Mode" and the user wishes to accesses the Configuration Database 120, control is transferred from the Monitor State 211 to the Configure Protection State 212 state. At this point, the user is issued a challenge. If the challenge is responded to incorrectly, the present user is considered to be an unauthorized user. After a pre-determined number (say three) of incorrect authentication attempts, the login functionality may be disabled for a predetermined duration including but not limited to a permanent duration. On the other hand, upon successful authentication, control is transferred to the Update DB State 213.

In the Update DB State 213 state, the user is allowed to make changes to configuration described earlier but with a timeout window. A timeout duration is provided to ensure that the Update Database is protected in case the authorized user walks away and later an unauthorized user walks up to the protected machine and makes malicious changes. Once the user desired changes are made, further actions may need to be made in such processes that are currently running and being protected by Client ICE 101 already. For this purpose, control is transferred to the House Keeping State 214.

In the House Keeping State 214, house keeping performs tasks appropriate in the context of the configuration/administrative changes made by the user/IT Manager. For instance, if the user has decided to change the mode of operation as described above from "Full Feature" to "Optimized" instrumentation for libraries may be performed for each protected application by the Client ICE 101.

If the License mode described above is "Enterprise/Managed" mode instead of the "User Mode", configuration changes should be made remotely after automated certificate based authentication is performed. Periodically, the state machine is advanced to the Monitor State to determine if any updates are available. For the purpose of authentication with the appropriate Proxy ICE, control is transferred from the Monitor State 211 to the Negotiate Keys State 215. If the secure channel is not available in a predetermined period, control is transferred back to the Monitor State 211 and the timer for that state put into snooze mode so that it wakes up again shortly. If the secure channel is negotiated successfully, the state machine advances to the Query Proxy State 216.

Once a secure channel with the Proxy ICE 102 is available, appropriate messaging between the Client ICE 101 and the Proxy ICE 102 takes place in a Query Proxy State 216. If an update to the Client ICE 101 configuration is to be made, then control is transferred to the Update DB State 213. If no update needs to be made, then control is transferred back to the Monitor State 211 after that state's timer is armed again.

Figure 14:
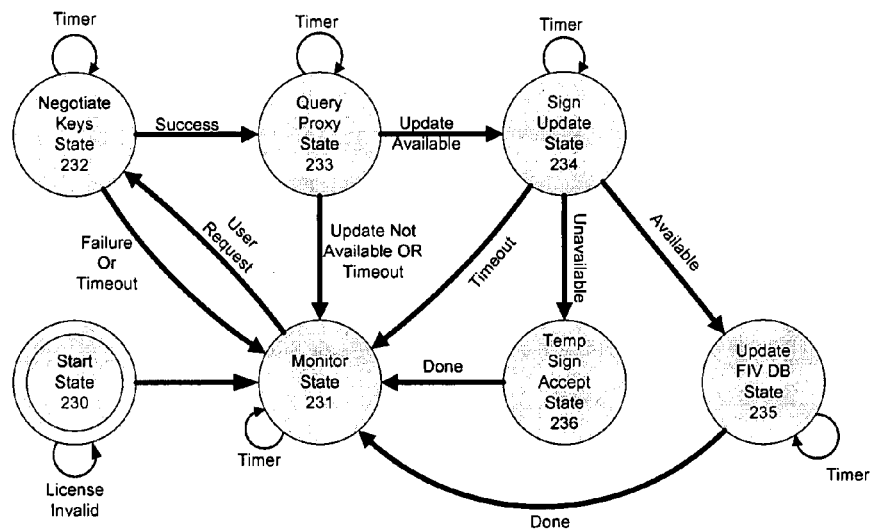
FIG. 14 depicts a state machine of the File Validation Engine of the Client ICE.

FIG. 14 depicts a state machine of the File Validation Engine of the Client ICE. The File Validation Engine updates the File Integrity Database 117 of FIG. 8 with the golden signature for each of the executables, including shared libraries of the installed applications.

In the Start State 230, after initialization is done, the validity of the license of the Client ICE 101 is examined. If the license is invalid, no further action is performed. However, if the License is valid, then control is transferred to the Monitor State 231.

In the Monitor State 231, either the user may wish to asynchronously obtain "golden" signatures from the Proxy ICE 102 or a protected application may request the "golden" signature for a module that hasn't been encountered previously or the File Validation Engine may perform maintenance in that it may obtain the "true" golden signature of a file which has previously been implicitly trusted by the user for expediency reasons. In all three situations, control is transferred from the Monitor State 231 to the Negotiate Key State 232 so as to create a secure channel for communication with the Proxy ICE 102. A state flag associated with a file's record can be placed in the File Integrity Database so that (a) the nature of "trust"-implicitly trusted signature or explicitly trusted signature and (b) the current state-negotiation is in progress or not in progress can be determined by examining this flag.

If a secure channel can be established with the Proxy ICE 102 servicing this instance of Client ICE 101, then the state machine advances into the Query Proxy State 233. Alternatively, whether the channel could not be established, the Negotiate Keys State 232 relinquishes state machine control back to the Monitor State 231.

In the Query Proxy State 233, the Proxy ICE 102 informs the Client ICE the status of the requested file in its own database. If a golden signature of the requested file is not available or a timeout event happens before the Proxy ICE reply is received, the Client ICE state machine advances into the Monitor State 233. On the other hand, if the golden signature is available at the Proxy ICE, the state machine at the Client ICE advances into the Sign Update State 234. In the Sign Update State 234, once the golden signature and associated information is downloaded, control is passed to the Update FIV DB State 235. Here the file state flag in the local File Integrity Database is updated and the details of the file(s) added into the File Integrity Database are written in the Vulnerability Log 118. Subsequently, control is transferred back to the Monitor State 231. On the other hand, if the signature cannot be obtained or cannot be obtained in a reasonable time period, the Sign Update State 234 relinquishes control of the state machine to the Monitor State 231.

Figure 15:
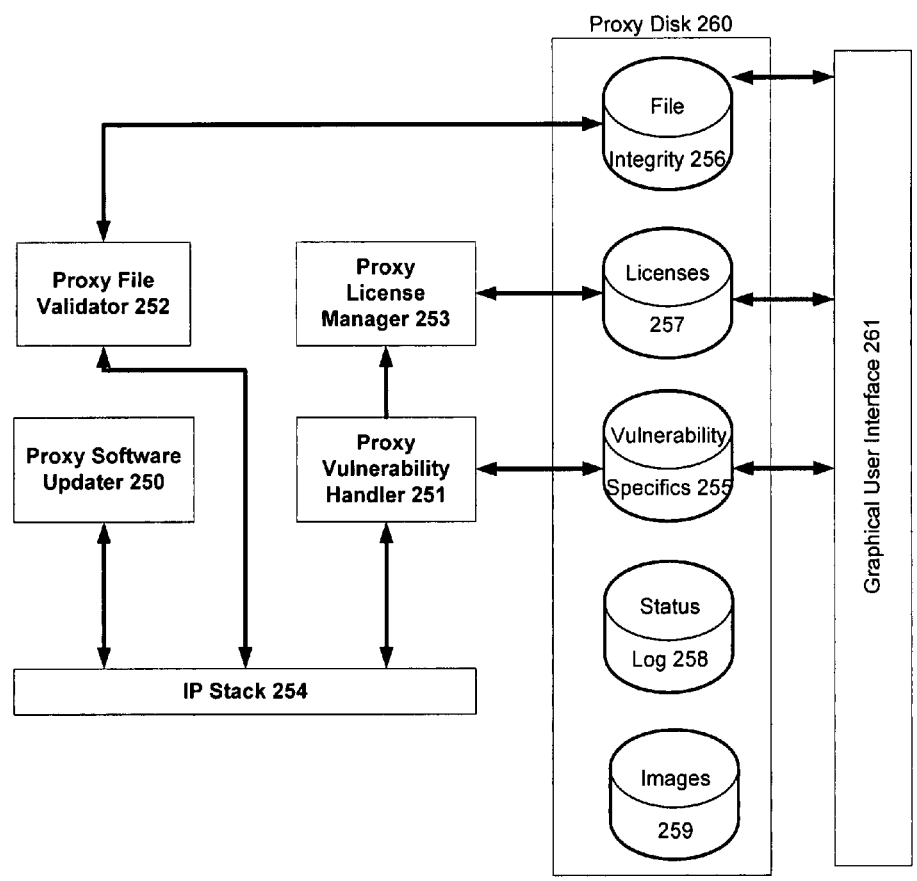
FIG. 15 is a block diagram of a Proxy ICE.

FIG. 15 is a block diagram of the Proxy ICE 102. In particular, FIG. 15 shows the block diagram of the functionality present at each Proxy ICE 102 of FIG. 7. In an embodiment, functionality contained in each individual block is as described below. It is useful to note that from the point of view of the end user, the Proxy ICE 102 provides functionality that is identical to the Master ICE 103 and therefore, the Client ICE 101 can communicate directly with the Master ICE 103 instead of the Proxy ICE 102. Based on the keys exchanged while setting up a secure channel, it is possible to determine what entity is at the other end of the connection.

Figure 16:
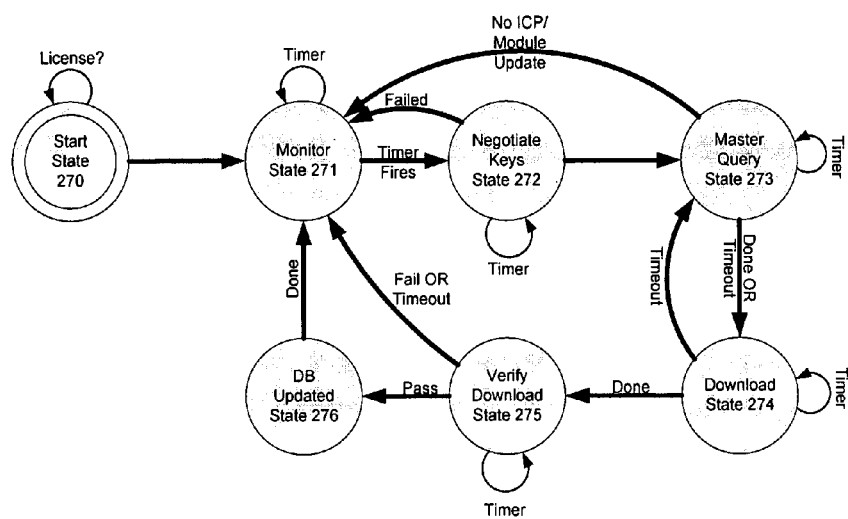
FIG. 16 is state machine diagram that shows a Software Update Engine shows operating at the Proxy ICE.

The Proxy Software Update Engine 250 is responsible for servicing Client ICE 101 requests for Client ICE Software Engine Updates. Downloaded images are placed in the Images Database 259. The Proxy ICE 102 may in turn obtain requested modules from the Master ICE 102/authorized IT Manager. The Proxy File Validation Engine 252 responds to Client File Validation requests. It can obtain the image as well as the golden signatures for files requested by the Client from the Master ICE 103 in case it does not have the desired files in its own database. Images are placed in the File Integrity Database 256. The Proxy License Management engine 253 makes licenses available to Client ICE upon request. It also provides an eCommerce Web Interface to those Clients that wish to pay for new/updated licenses. These transactions are recorded in the License Database 257. The Proxy Vulnerability Logging Engine 251 logs the new vulnerability the Client may have discovered as a result of the Client ICE running on the user's PC. The logs are archived in the Vulnerability Database 255. System messages of the Proxy ICE are written into the Status Log database 258. The Enterprise/Master IT Manager can interact with any database using the Graphical Interface 261. The Manager may place new images into the File Integrity database 256 directly or under the FIG. 16 is the state machine diagram of the Software Update Engine 250 operating in the Proxy ICE 102. On boot up, the Proxy Software Update Engine 250 boots up in the Start State 270. After initialization, in the Start State 270 the validity of the License is examined. If the license is invalid, no further processing needs to be done. However, if the License is valid, control of the state machine is transferred to the Monitor State 271.

In the Monitor State 271, periodically, a secure channel is opened to communicate with the Master ICE 103 to determine if the software for any sub engine (including but not limited to Engines 150 through 153) of the Proxy ICE 102 or the Client ICE 101 (including but not limited to sub engines 110 through 115) have been updated and are available for download. In order to establish the secure channel, control of the state machine is transferred to the Negotiate Keys State 272. If the secure channel is not established in a reasonable period of time, the Negotiate Keys State 272 transfers control back to the Monitor State 271.

In the Master Query State 273 state, the Proxy ICE 102 determines if the version numbers of the Proxy 102 and Client ICE 101 sub engines are older than those available for download from the Master ICE 103. If the versions on the Proxy ICE 102 are older, then a download request is made by the Proxy ICE. For this purpose, control is transferred to the Download State 274. If however, no update is available or information is not available in a reasonable time, control of the state machine is transferred back to the Monitor State 271.

Once in the Download state 274, the image for the sub-engine(s) that is to be updated is obtained securely using the secure channel that was set up earlier. Also obtained is an integrity signature for the image. Once the download is completed, control of the state machine is transferred to the Verify Download State 275 and the secure channel torn down. If the download is not completed in a reasonable amount of time, control of the state machine is transferred back to the Master Query State 273 for making another attempt at a later time.

In the Verify Download State 275, the integrity of the recently downloaded file is checked before the sub-engine image can be accepted. An integrity checksum is computed on the received image and compared to the expected checksum as informed by the Master ICE. If the two compare favorably, then the state machine is advanced to DB Updated State 276. However if the checksum does not compare of if the comparison is not completed in a reasonable time frame, failure is declared and the timer in the Monitor State 271 is placed in snooze mode so that the operation can be repeated shortly.

Once a good image is ready, it is saved on the Proxy ICE 102 and the Image Database 259 is updated. Appropriate house keeping activity is performed so that future queries by Client ICE 101 can be answered with this latest information. Once that operation is completed, control is transferred back to the Monitor State 271.

In another embodiment, a process similar to that described above is followed. In this embodiment, instead of asking the Master ICE 103 for ICE sub-engines, requests are placed for user space modules. User space modules are such user executables or libraries that have been implicitly "trusted" for expediency reasons. From time to time, the Client ICE may ask the Proxy ICE to explicitly inform it of the actual integrity information. In case that information is not available at the Proxy ICE, the latter entity makes a request from the Master ICE using the state machine of FIG. 16.

Figure 17:
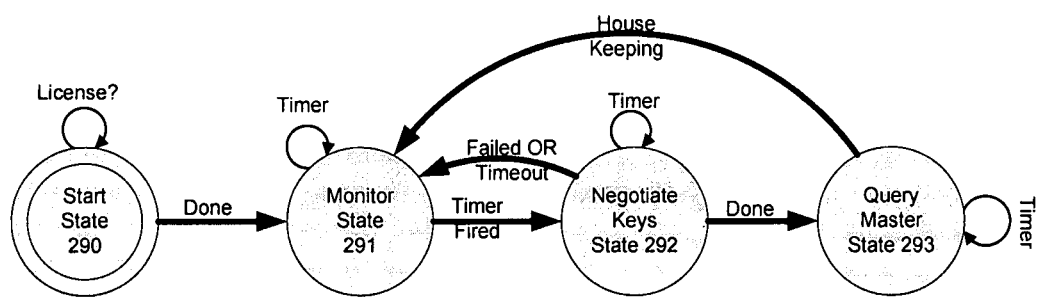
FIG. 17 is state machine diagram that shows a Vulnerability Logging Engine at the Proxy ICE.

FIG. 17 is state machine diagram that describes the functionality at the Vulnerability Logging Engine of the Proxy ICE. The Proxy Vulnerability Logging Engine 251 ensures that the Master ICE 103 stays informed if any new vulnerability is discovered at a Client ICE 101 serviced by the Proxy ICE 102. The details of this functionality are as follows:

In the Start State 290, after due initialization, the validity of the Proxy License is examined. If the License of the Proxy ICE 102 is invalid, no further action is performed. If the license is valid, then control is transferred to the Monitor State 291.

In order to log details of a new vulnerability into the Master ICE, a secure channel is opened with the Master ICE 103. If the channel cannot be opened in a reasonable time or there are errors in the negotiation process, control of the state machine is returned to the Monitor State 291 and its timer is put into snooze mode so that the negotiation process can be repeated shortly thereafter. If the negotiation is successful, control is transferred to the Query Master State 293.

In the Query Master State 293, the details (including but not limited to the module name, vendor name, module version, address of the faulting instruction and type of fault) of all vulnerabilities determined to be fresh vulnerability (not repetition of entries already present in the Proxy ICE Vulnerability Database 255) are exchanged with the Master ICE 103. The Master ICE 103 may respond that the said vulnerability is already known to it through another Proxy ICE 102 it services, the status of the vulnerability in the Proxy ICE Vulnerability Database 255 is updated as "synchronized" and control transferred back to the Monitor State 291.

Figure 18:
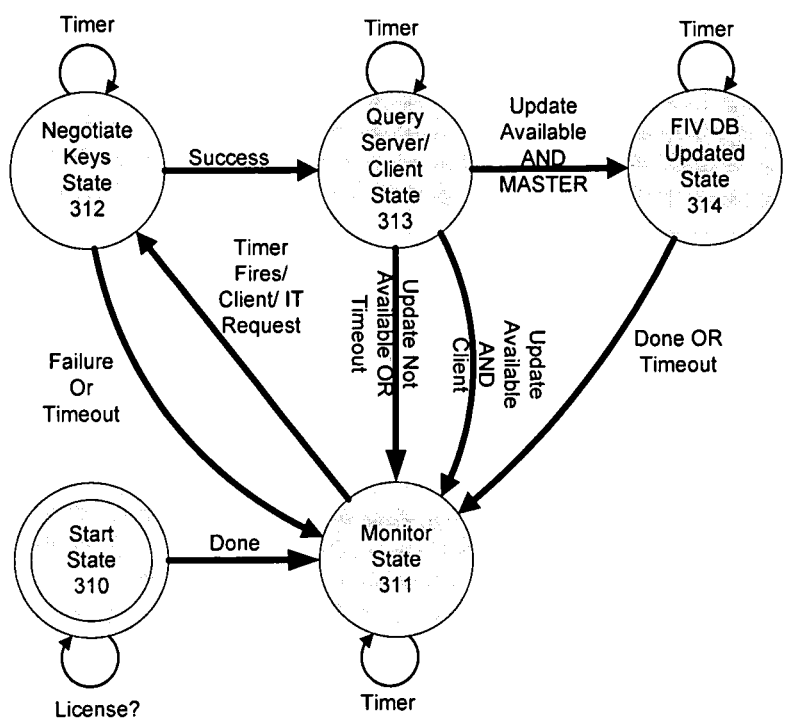
FIG. 18 is state machine diagram that shows a File Validity Engine in Proxy ICE.

FIG. 18 is state machine diagram that describes the File Validity Engine in the Proxy ICE. The Proxy ICE File Validity Handler 252 is responsible for servicing not only requests for golden signatures of new files made by the Client ICE 102 but also interfacing with a Master ICE 103 to obtain golden signatures for such files whose golden signatures are not present in its local File Integrity database 256.

In the Start State 310, after due initialization, the validity of the Proxy ICE license is examined. If the license is invalid, then nothing further needs to be done. In case the license is valid, then control of the state machine is transferred to the Monitor State 311.

In the Monitor State 311, requests for setting up a secure channel can be received asynchronously from the Client ICE 102 or from an IT Admin. In addition, the Proxy ICE 102 may periodically contact the Master ICE 103 to get signatures for those files that were requested by a Client ICE 101 but were not available in its own File Integrity database 256. In each of these cases, control of the state machine is transferred to the Negotiate Keys State 312 to initiate the process of opening a secure communication channel.

In the Negotiate Keys State 312, the Proxy ICE 102 starts the process of establishing the secure channel. This can be done by many mechanisms including but not limited to performing asymmetric key exchange using RSA1024 or Diffie Helman 1024 technologies. If the negotiations are successful and encryption/decryption keys are established successfully, the Negotiate Keys State 312 transfers state machine control to the Query Server/Client State 313. If however, encryption or decryption keys cannot be established for whatever reasons in a reasonable amount of time, the timer for the Monitor State 311 is put into snooze mode and control transferred back to the Monitor State 311.

As mentioned above, the Proxy ICE 102 is a bridge between the Client ICE 101 and the Master ICE 103. Therefore, a Query Server/Client State 313 the state per connection should be maintained. This state information indicates the identity of the remote end of the connection. If the connection is with a Client ICE 102, then the Proxy ICE 102 performs a database query into its local File Integrity database 256 to determine if the requested file integrity information is present in its database. In case a golden signature for the file requested by the Client is available, then the golden signature is sent back to the Client and control of the state machine transferred back to the Monitor State 311. If however the golden signature is not available locally, then the Proxy ICE 102 stores the request and on the next Master ICE synchronization request, attempts to obtain the signature from the Master ICE. When a signature is requested from the Master ICE 103, the signature may not be available at the Master ICE 103 either. In such a case, control of the state machine is transferred back to the Monitor State 311. However, if the Master ICE 103 responds back with the golden signature, then the Proxy ICE 102 transfers control to the FIV DB updated state 314.

In the FIV DB Updated State 314, the FIV DB attempts to write the recently obtained golden signature into the File Integrity database 256. Once the signature is updated, control of the state machine is transferred to the Monitor State 311. On the other hand, if the process of writing to the File Integrity Database 256 cannot be accomplished in a reasonable amount of time, the timer for the Monitor State 311 is placed in snooze mode and the original request queued again so that another attempt to contact the Master ICE 103 can be made again.

Figure 19:
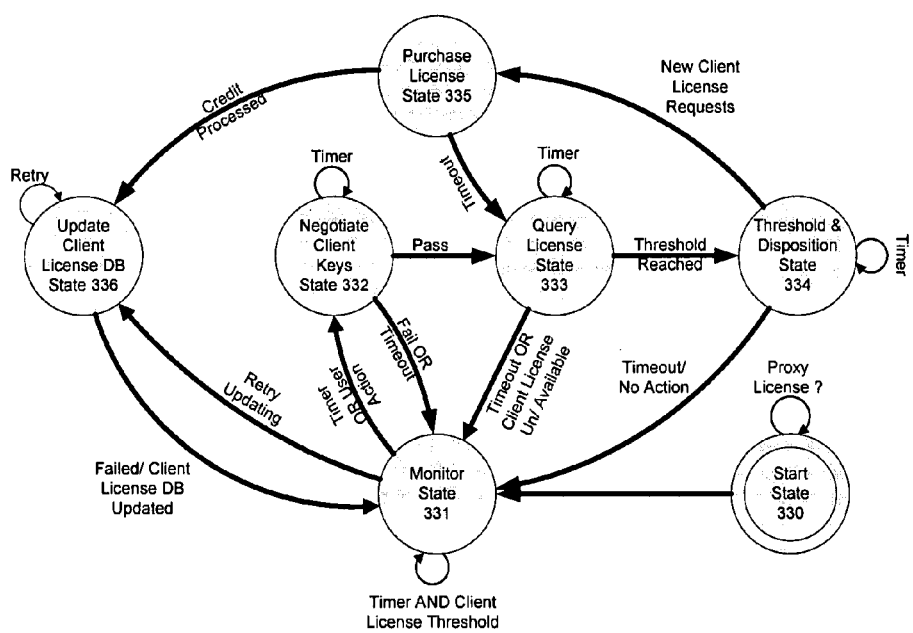
FIG. 19 is state machine diagram that shows a License Management Engine in a Proxy ICE.

FIG. 19 is state machine diagram that describes the functionality present in the Proxy ICE License Management Engine 253. In an embodiment, the Proxy ICE License Management Engine performs two roles. In the first role, the Proxy ICE 102 manages licenses for registered Client ICE 101, running in "Enterprise" mode that requests a license temporarily. When an enterprise user runs software applications that do not require ICE protection as determined by the security policy of the enterprise, the Client ICE license can be released back into the Client ICE License pool at the Proxy ICE 102 so that other users may avail of the Client license temporarily. This allows the enterprise to share licenses from a pool and not have to buy a license for each user. The second role that the Proxy ICE plays is to initiate request for ordering new licenses from the Master ICE 103. This event can be either periodic (i.e., when enterprise Client ICE licenses are about to expire) the Proxy ICE License Management Engine 252 can remind the IT Manager to renew the licenses. This functionality may be used asynchronously as well when the IT Manager determines more Client ICE licenses are required because the License Pool is continuously reporting shortage of availability of "Enterprise Mode" Client ICE License. At that point, the Proxy ICE 102 can either initiate a request for automatically upgrading the License Pool with a larger number of Client ICE licenses. This process is described in the state machine of FIG. 19.

The Proxy ICE License Management Engine 253 state machine wakes up in the Start State 330. In this state, after due initialization, the validity of the Proxy ICE 102 License is examined. This license is different from the Client ICE 101 license pool that the Proxy ICE 102 manages. If the Proxy ICE License is invalid, then nothing further needs to be done. If the license is valid, control is transferred to the Monitor State 331.

In the Monitor State 331, the Proxy ICE 102 can receive requests to either renew existing licenses or buy new licenses and such requests can be initiated by either Client ICE or by an IT Manager. In either case, the Monitor State 331 yields control of the state machine to the Negotiate Keys State 332. The Timer ensures that a periodically unsuccessful attempt to complete the transaction is repeated shortly.

As described above, the Proxy ICE 102 communicates with both the Master ICE 103 and the Client ICE 101. Therefore, a state indicating what entity is at the other end of the connection is to be maintained for each connection. The Negotiate Client Keys State 332 attempts to establish a secure channel with the other end—whether a Client ICE 101 or a Master ICE 103. The secure channel can be negotiated using standard techniques including but not limited to asymmetric key exchange followed by establishment of encryption/decryption keys. If the channel cannot be established, in a reasonable time frame, control of the state machine is returned back to the Monitor State 331 so that this operation can be attempted again. If the secure channel can be established, control of the state machine is passed to the Query License State 333.

As described above, the Query License State 333 may communicate with either Client ICE 101 or Master ICE 103. If the remote entity happens to be a Client ICE 101, the Query License State 333 examines the local License Database 257 to examine if an "Enterprise" license is available in the pool. Once it finds an available license, information and confirmation of the license is sent down to the requesting Client ICE 101 and control returned to the Monitor State 331. If a free license is not available in the "Enterprise" license pool, a message is sent down to the Client ICE 101. If the look up does not succeed in a reasonable duration, the Query License state transfers control of the state machine back to the Monitor State. If the remote entity is a Master ICE 103, a count of Client ICE licenses that are past their threshold duration of life span is communicated to the Threshold & Disposition State 334.

In an embodiment, the fact that the Proxy ICE License Management Engine 253 is in the Threshold & Disposition State 334 state indicates that either some Client ICE licenses in the pool are about to expire of new ones are needed anyway to deal with the increased usage. This condition can be indicated to the IT Manager by sending an automatic email. If a user has initiated the asynchronous request for augmenting the Client ICE License pool, an email to the IT Admin is not required. If the number of users requesting licenses and not getting them has exceeded the available licenses by a certain IT Manager preset limit, then this state can initiate the purchase of additional Client ICE Licenses. Such actions are performed in the Purchase License State 335. However, it may be possible that a user initiated asynchronous request to add licenses is not followed through in an adequate time period. In that scenario, the Threshold & Disposition State 334 transfers control to the Monitor State 331.

In the Purchase New License State 335, a request is made to the Master ICE 103 and the receipt for the transaction is generated and emailed to the IT Manager. If the credit request is processed successfully by the Master ICE 103, confirmation is sent down to the Purchase New License State 335. At that point the Purchase New License State 335 transfers control to the Update License DB state 337. However, if the credit is not processed in a reasonable time, the Purchase New License State 335 cancels the upgrade request and sends an email to the IT Manager and transfers control of the state machine to the Query License State 333.

In the Update License DB State 336, the information about the obtained Licenses is written into the local License Database 257. This process is retried until it is successful or a certain number of attempts have been made. Whether the write operation failed or succeeded, the IT Manager is informed of the purchased license and current update status through an email and control of the state machine transferred back to the Monitor State 331.

In an embodiment, the Proxy hard disk 260 is the repository for the encrypted File Integrity Database 256, the License Database 257, the Vulnerability Database 258 and the unencrypted Status Logs. Additional configuration information, such as Threshold period for Client ICE License expiry; preset limit on how many times and how many un-serviced user events should occur in order to initiate a request to buy new licenses. Also saved on the disk is the Proxy ICE License. These databases can be accessed by the IT Manager by using the Graphical User Interface 261.

The Graphical User Interface 261 provides access to the encrypted and unencrypted databases described in Proxy Disk 260 above after local authentication. The Graphical User Interface also provides a mechanism to renew the Proxy License. Also provided is read/write access to the application configuration global variables as described above.

Figure 20:
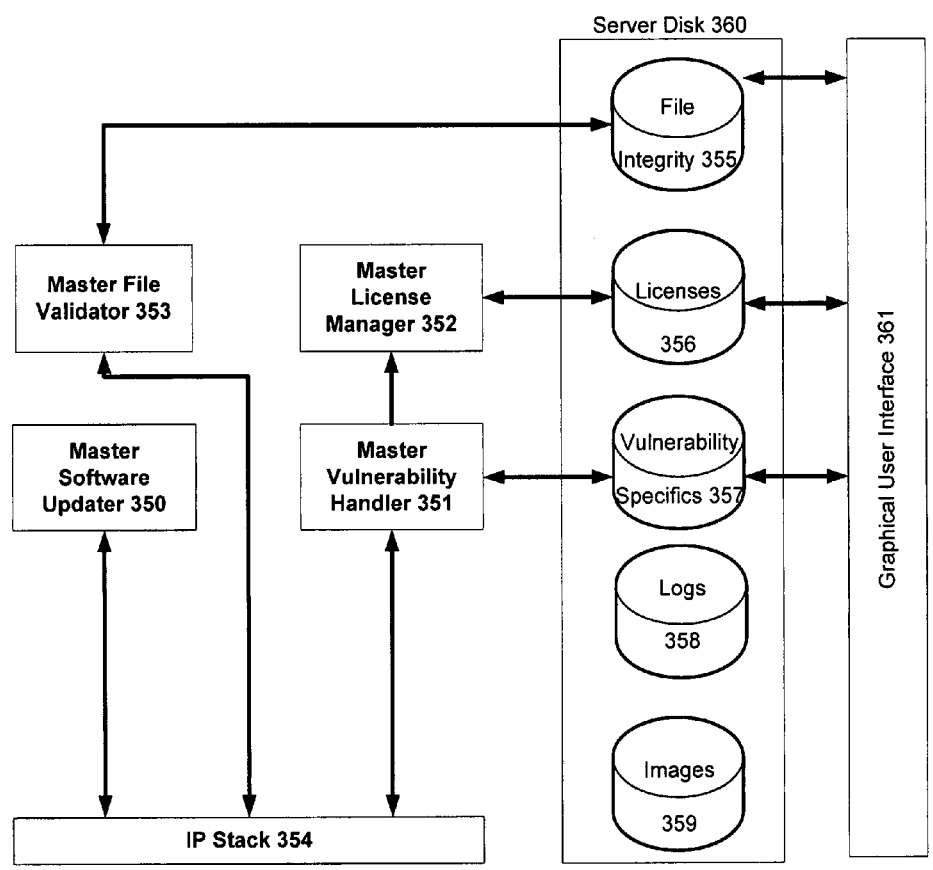
FIG. 20 depicts a block level functionality in a Master ICE.

FIG. 20 depicts the block diagram functionality of the Master ICE of FIG. 7. Functionality contained in each individual block is as described below. It should be understood that while it is typical for the Master ICE is to service Proxy ICE 102 requests, the Master ICE can also provide Proxy ICE 102 like services to a end user who runs the Client ICE 101 in "User/Managed Mode" and may not have a Proxy ICE 102 servicing its Client ICE 101.

In an embodiment, one of the functionality of the Master Software Updater 350 is to service requests for a new image of Client ICE 101 or Proxy ICE 102 engines by the appropriate entities. When a remote entity requests new software images, the Master ICE software update engine reaches into the Images Database 359. It also services the Client ICE 101 for golden signatures for files they may have had to trust implicitly. In order to service remote requests for integrity information, it reaches into the File Integrity Database 355. The Master ICE 103 also maintains the licenses for Client ICE and Proxy ICE. Information for Licenses is stored in the License Database 356. It also stores records information about vulnerabilities discovered by Client ICE by storing pertinent information about the vulnerability in the Vulnerability database 357. Real time important system information is placed in the Logs Database 358. This data allows the IT Admin of the Master ICE to perform auditing and trouble shooting. The IT Manager also uses the Graphical User Interface 361 to read and write the various databases. Some databases can be written to by the IT Manager, where some databases have read only capabilities.

Figure 21:
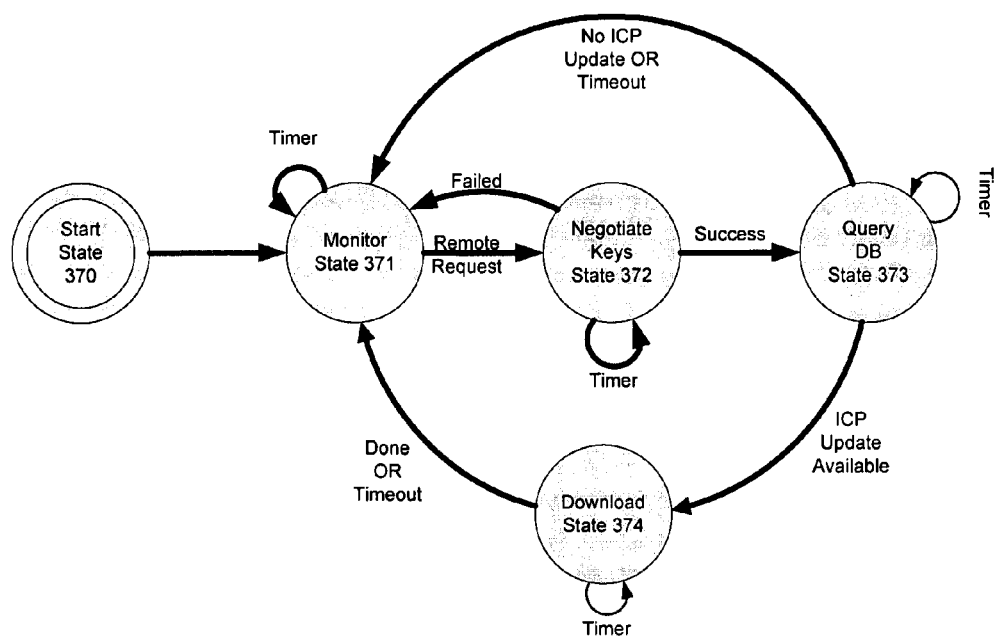
FIG. 21 is state machine diagram that shows a Software Update Engine operating at the Master ICE.

FIG. 21 is state machine diagram that shows a Software Update Engine operating at the Master ICE. The Master ICE is implemented as a server and can accept many concurrent connections. In the Start State 370, after due initialization, control of the state machine is transferred to the Monitor State 371. An Enterprise based Proxy ICE 102, a Managed Service Provider based Proxy ICE 102, or an individual "User Mode" Client ICE 101 may seek to make a connection and obtain images, golden signatures, and a licenses, sometimes new, or inform the Master ICE of vulnerabilities, which may be new. Whatever be the reason, a connection is established in the Monitor State 371. While no differentiation needs to be made between the two types of Proxy ICE 102 described above, differentiation needs to be made for whether it is a Client ICE 101 or Proxy ICE 102 that is requesting a connection. In an embodiment, the Service Provider's Proxy ICE 102 and the Enterprise Proxy ICE 102 are indistinguishable from the Master ICE 103 point of view. When a remote entity, whether a Proxy ICE 102 or a Client ICE 101, requests a connection, the Master ICE spawns a new thread and establishes a secure channel with the remote entity before state machine control is transferred to the Negotiate Keys State 372. Based on the keys exchanged while setting up a secure channel, it is possible to determine what type of entity is at the other end of the connection.

In the Negotiate Keys State 372, two-way authentication is performed with the remote entity. Existing authentication mechanisms such as asymmetric keying instances of RSA1024 or Diffie Hellman 1024 are used to establish encryption and decryption session keys. If the latter set of keys can be established in a reasonable time period, control is transferred to the Query DB State 373 otherwise; control is passed back to the Monitor State 371 and the thread associated with the connection is terminated.

In the Query DB State 373 state, the Image Database 239 is queried and compared with the details of the image at the remote entity. If the local image version is later than that of the remote entity, the appropriate new image present in the Image DB 359 will be pushed down to the remote entity. That operation is performed in the Download State 374. If however, either the remote request cannot be answered in a reasonable time or if there is no update available, the secure channel and thread is torn down and control transferred back to the Monitor State 371.

In the Download State 374, the appropriate image is pushed down over the secure channel to the requesting remote entity using a secure file transfer protocol. At the end of the download or after a reasonable timeout period, the secure channel is torn down and control transferred back to the Monitor State 371 to await another connection request. A log for the transaction is written into the Log Database 358.

Figure 22:
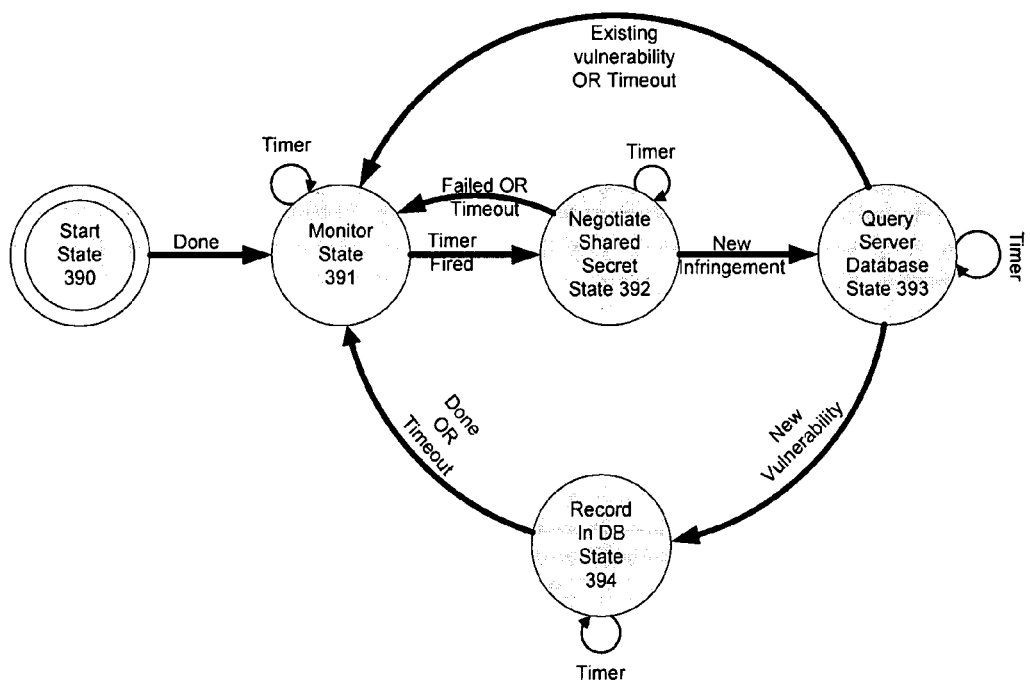
FIG. 22 is state machine diagram that shows a Vulnerability Logging Engine that operates at a Master ICE.

FIG. 22 is state machine diagram that shows a Vulnerability Logging Engine that operates at a Master ICE 103. In an embodiment, the Master Vulnerability Engine 351 of FIG. 20 obtains information, from each of the Proxy ICE 102 serviced, about new vulnerabilities reported from the Client ICE 101 they service. The Master Vulnerability Engine 351 ensures that a vulnerability, such as a unique vulnerability, records are present in the Vulnerability database 357. An attempt to write vulnerabilities already present in the Vulnerability Specifics database 357 is rejected. This duplicate checking is facilitated by the vulnerability nomenclature. The name of the vulnerability is a combination of the name of the module, the major and minor version number and the relative address of the assembly instruction that was found vulnerable. This name of the vulnerability is identifiable (e.g., unique) and easy to determine if a given vulnerability is exists in the database.

In Start State 390, after due initialization, control of the state machine is transferred to the Monitor State 391.

In the Monitor State 391, access to the Master ICE 103 can be made asynchronously by an Enterprise based Proxy ICE 102, a Service Provider based Proxy ICE 102, or an individual "User Mode" Client ICE 101. For each connection, a temporary thread is created for further handling of the connection. This thread is destroyed at the end of the communication. While no differentiation needs to be made between the two types of Proxy ICE 102, differentiation can be made for whether it is a Client ICE 101 or Proxy ICE 102 requesting a connection. In an embodiment, the Service Provider's Proxy ICE 102 and the Enterprise Proxy ICE 102 are indistinguishable from the Master ICE 103 point of view. Based on the keys exchanged while setting up a secure channel, it is possible to determine what entity is at the other end of the connection. A list of serviced entities is available in the License Database 356. In order to facilitate the establishment of the secure channel for communication, the state machine advances into the Negotiate Shared Secret State 392.

In the Negotiate Shared Secret State 392, two-way authentication is performed with the remote entity. Existing authentication mechanisms such as asymmetric keying instances of RSA1024 or Diffie Hellman 1024 are used to establish encryption and decryption session keys. If the latter set of keys can be established in a reasonable time period, control is transferred to the Query Server DB State 393 otherwise; control is passed back to the Monitor State 391 and the temporary thread is destroyed.

In the Query Server DB State 393, the Vulnerability Database 357 is queried for the presence of the reported vulnerability. If the vulnerability already exists in the Master ICE Vulnerability Database 357, the Query Server DB State 393 turns state machine control back to the Monitor State 391 and the temporary thread is destroyed. If however the vulnerability reported by the remote entity is a unique one, its details are recorded in the Vulnerability Database 357. This last operation is actually performed in the Record in DB State 394. If however, the remote entity's information cannot be acted upon in a reasonable time the appropriate status is communicated to the remote entity, the secure channel torn down and control transferred back to the Monitor State 391.

In the Record in DB State 394, details of the appropriate vulnerability are pushed down into the Vulnerability database 357. A log is written into the Log Database 358. If the vulnerability cannot be recorded into the database, an email is sent to the owner/operator's tech support. When a new entry is successfully written into the database, an email is sent to the Owner's so that the vendor for the newly reported vulnerability is informed.

Figure 23:
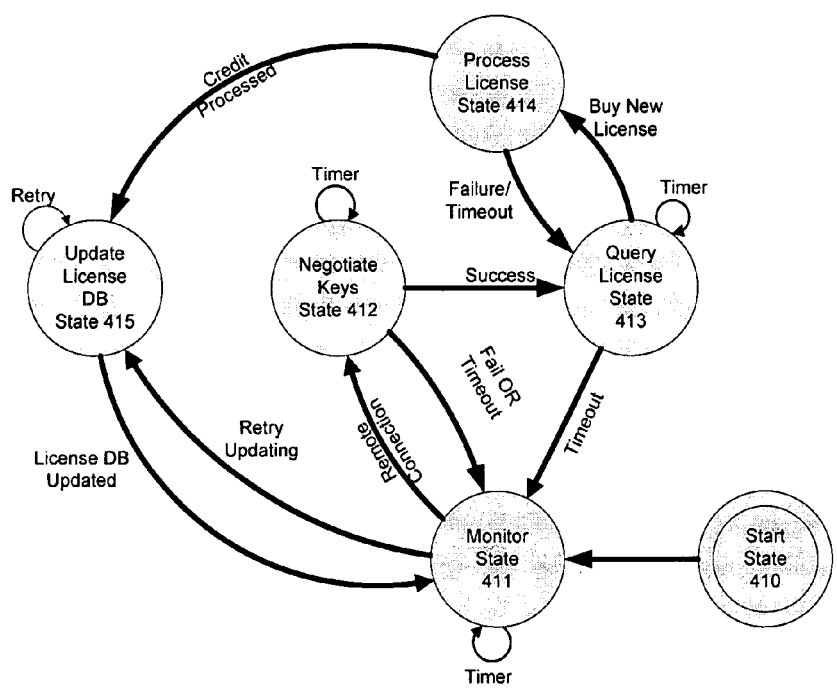
FIG. 23 is state machine diagram that shows a License Management Engine in a Master ICE.

FIG. 23 is state machine diagram that shows a License Management Engine 352 in the Master ICE of FIG. 20. In an embodiment, the primary functionality of the Master License Handler 352 is to provide a mechanism for a user to buy more Proxy ICE 102 or Client ICE 101 licenses. The details of the licenses bought in the past and those currently active present are stored in the License Database 256. These licenses are indexed by email addresses of the user. Querying the database is easy based on this email address.

In Start State 410, after due initialization, state machine control is transferred to the Monitor State 411. In Monitor State 411, when a new remote connection is requested by either a Proxy ICE 102 or from a "User Mode" Client ICE 101, a thread is spawned and state machine control transferred to the Negotiate Keys State 412.

In the Negotiate Keys State 412, two-way authentication is performed with the remote entity. Existing authentication mechanisms such as asymmetric keying instances of RSA1024 or Diffie Hellman 1024 are used to establish encryption and decryption session keys. If the latter set of keys can be established in a reasonable time period, control is transferred to the Query License State 413 otherwise; state machine control is passed back to the Monitor State 411 and the temporary thread destroyed. The remote entity could be requesting either a Proxy ICE 102 License or a Client ICE 101 license depending on the type of entity. Even though only "user mode" Client ICE 101 can be requesting a remote connection to the Master ICE License Management Engine 352, a Proxy ICE 102 may be requesting a set of "Enterprise Mode" or "Managed Mode" Client ICE licenses on their behalf.

In the Query License State 413, the Master ICE 103 performs a look up for the existing License for the remote entity in the License Database 356. If a currently valid license is found, then the validity of the new license is extended from the last effective date of the currently valid license. The remote entity's bank should be charged for the license and that operation is performed in the Process License State 414.

In the Process License State 414, the Master ICE 103 connects to the remote entity's bank in order to authorize the credit. If that operation is successful in a reasonable period of time, then control is transferred to the Update License DB State 415. Otherwise control is transferred to the Query License State 413 with a failure message and the temporary thread created in the Monitor State 411 is destroyed.

In the Update License DB State 415, the details of the newly issued license are recorded in the License Database 356. If that operation cannot be completed in a reasonable time, then state machine control is transferred back to the Monitor State 411 with an appropriate error message. The temporary thread is also destroyed. The Monitor State 411 attempts to write the details of the license into the database once again. If repeated attempts are unsuccessful, an email is sent to the operator's Tech Support along with the details of the license. The license is inserted in the License Database 356 manually.

Figure 24:
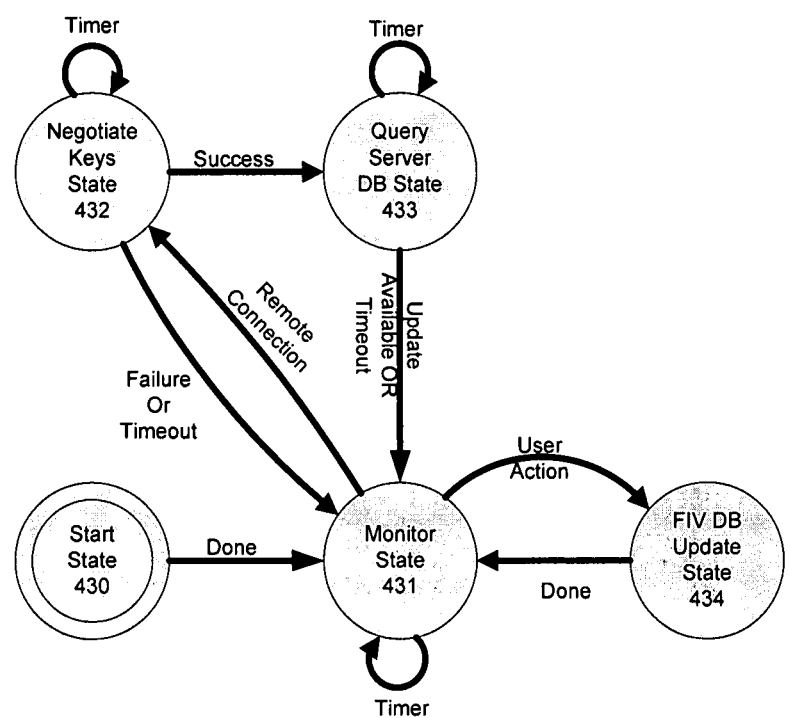
FIG. 24 is state machine diagram that shows a File Validity Engine in a Master ICE.

FIG. 24 is state machine diagram that shows a File Validity Engine 353 of FIG. 20 in a Master ICE 103. In an embodiment, the purpose of the Master File Validator 353 is to service remote requests for golden signatures of files.

In Start State 430, after due initialization, state machine control is transferred to the Monitor State 431. In the Monitor State 431, when a new remote connection is received from either a Proxy ICE 102 or from a "User Mode" Client ICE 101, control is transferred to the Negotiate Keys State 432 and a temporary thread spawned. At some point in time, the operator's representative may wish to add a golden signature into the File Integrity database 355. The Monitor State 431 provides a means to input such golden signatures. Such an action is performed in the FIV Update DB State 434.

In Negotiate Keys State 432, two-way authentication is performed with the remote entity. The remote entity could be a Proxy ICE 102 or a "User Mode" Client ICE 101. Existing authentication mechanisms such as asymmetric keying instances of RSA1024 or Diffie Hellman 1024 are used to establish encryption and decryption session keys. If the latter set of keys can be established in a reasonable time period, control is transferred to the Query Server DB State 433 otherwise; state machine control is passed back to the Monitor State 431 and the temporary thread destroyed.

In Query Server DB State 433, the Master ICE 103 looks up the File Integrity database 355 to determine if the golden signature exists or not. If the signature is available, the same is passed on to the requesting entity over the secure channel. If the same is not available, an email to the patent operator's Tech Support team is generated and an entry made into the Log database 358. Upon completion of the above steps, control is returned to the Monitor State 431 and the temporary thread is destroyed.

When an IT Manager enters a new golden signature into File Integrity Database 355, the File Integrity databases of the redundant Master ICE 103 also need to be updated. That action is performed in the FIV Update State 434. Registered Master ICE are updated before the temporary thread is torn down.

The Server Disk 360 is the home for the databases used by the Master ICE. These include the golden File Integrity 355, License 356, Vulnerability 357, Status Logs 358 and the Image Databases 359. The contents of each the databases are encrypted and can use high security clearance to update and access. Access to these databases can be made through a Graphical User Interface 361.

The Graphical User Interface 361 provides access to the encrypted databases described in Proxy Disk 360 above once the person accessing the database has authenticated themselves. One database that is not encrypted is the Status Log 358 database. That database is a read only database for the IT Manager. A high level of authentication, physical and data security should be used to make changes to these databases.

It should be understood that any of the processes disclosed herein, such as the detecting and correcting of memory corruption, may be implemented in the form of hardware, firmware, or software. If implemented in software, the software may be processor instructions in any suitable software language and stored on any form of computer readable medium. The processor instructions are loaded and executed by a processor, such as a general purpose or application specific processor that, in turn, performs the example embodiments disclosed herein.

While this invention has been particularly shown and described with references to example embodiments thereof, it will be understood by those skilled in the art that various changes in form and details may be made therein without departing from the scope of the invention encompassed by the appended claims.

Overview

A set of invariant checks that can detect memory corruption in a process and/or hijacking of a program control flow. These checks are triggered by an invariant checker may reside inside a Secure Virtual Machine (SVM). The SVM tracks the execution of a process and invokes the invariant checker whenever program execution hits any location that use an invariant check (e.g., a return instruction in a function). If the invariant check passes, the process is allowed to continue past this location, otherwise an alarm is raised.

In an alternative embodiment, the secure virtual machine to employs emulation, where the processor is emulated in software and the application executes instructions on this emulated processor. This allows control over the execution of each instruction and allows the VM to transparently intercept program execution at any location.

The control can be created by using a debugger. Debuggers intercept process execution of a program. An assembly-level debugger, for instance, can set breakpoints at desired locations. The debugged process continues to execute normally until a breakpoint is reached. At this point, the OS suspends execution of the process and transfers control to the debugger process. Process execution can be resumed after examining process state.

A secure virtual machine employs a process that starts up (or when the SVM attaches to a new process that uses the protection), and regenerates assembly instructions from the machine code and a checkpoint or list of checkpoints generated by code segments is an assembly instruction where an invariant check is performed (e.g., a return, call or jump). A table of checkpoints indicating these locations and the check to be performed is generated. Breakpoints are then inserted at each checkpoint. The process of setting a breakpoint involves replacing the original instruction by INT-3 (an assembly instruction that generates a software interrupt); the original instruction is saved in the checkpoint table. When program execution reaches this location, an interrupt is generated, which invokes the operating system. The OS then transfers control to the debugger process attached to the process (the SVM). The SVM then performs the invariant check for this checkpoint, looks up the original instruction (which may be saved in the checkpoint table) and executes the original instruction. Program execution resumes until the next checkpoint is hit. Thus, achieving the goal of intercepting program execution transparently and performing invariant checks without incurring the overhead of a full/heavyweight virtual machine.

The SVM may be separate process that controls the execution the protected process; since two processes have different address spaces, it is difficult to circumvent invariant checks by corrupting the memory of the original process. Further invariant checks states (e.g., the shadow IAT, a second copy of the return address etc) are saved in the address space of the SVM, which prevents an adversary from corrupting these values (if these are present in the same address space as the process, the invariant checks may be vulnerable).

The virtual machine and invariant checks impose a small overhead. Invariant checks can be implemented in a few assembly instructions each. For instance, a call checkpoint involves storing the address of the next assembly instruction in a memory location (which involves reading the program counter register, incrementing it and storing it in a memory location). A return checkpoint involves looking up the return address on the stack and the address stored at call time. Most checks can similarly be implemented with minimal overheads. Since instructions such as call, return, jump are some of the less frequently occurring instructions in a program, the resulting slowdown due to program suspension and invariant check at each such checkpoint is substantially small. Further, the memory in the SVM to save register state or state of certain variables on the stack, heap or the shadow import/export tables is substantially small (on the order of a few megabytes per process). Since instrumenting a program with checkpoints or randomizing library may be done at load time, no files are changed on disk. The approach works with binary files and is transparent to an application. One side-effect is a slowdown incurred due the occasional suspension at each checkpoint.

A process can be multi-threaded and the SVM provides multi-threaded support by tracking each thread and maintaining shadow states of registers/stacks for each thread. Threads may be spawned dynamically or may be terminated and these events are tracked.

Memory corruption protection can be dynamically turned on or off for currently executing processes. The SVM attaches itself to a currently running process to allow the dynamic execution. The SVM efficiently disassembles the code segment and injects checkpoints into the executing process. Thus, the disassembly and checkpoint injection are optimized to minimize disruptions.

Shared libraries may include a different approach. Since a shared library is shared by multiple processes, the SVM does not inject checkpoints into the library code. If mechanisms are enabled for a subset of the processes sharing the library, then any unprotected process will crash upon encountering a checkpoint (which causes a software trap that is unhandled). To enable mechanisms to be turned on or off on a per-process basis, the loader is modified to load a copy, which may be private, of the shared library that can be instrumented with checkpoints independently of other process.

To operate with dynamically loaded libraries, the SVM traps events and instruments code with checkpoints as it loads into the process address space. A potential for memory corruption occurs in assembly code where a call into a function has no corresponding return instruction and return instructions without corresponding calls. Such calls and returns occur in carefully hand-optimized assembly code, and violate return address integrity check, resulting in a false positive in compiler-generated and hand-written assembly code are handled individually.

It should be understood that any of the processes disclosed herein, such as the detecting and correcting of memory corruption, may be implemented in the form of hardware, firmware, or software. If implemented in software, the software may be processor instructions in any suitable software language and stored on any form of computer readable medium. The processor instructions are loaded and executed by a processor, such as a general purpose or application specific processor, that, in turn, performs the example embodiments disclosed herein.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
   detecting an application layer memory corruption of at least one portion of a control section of original memory by malicious code during run-time, where the application layer memory corruption affects execution flow of an application when otherwise left uncorrected, wherein detecting includes performing at least two different invariant checks from a set of invariant checks at run-time, the set of invariant checks includes at least two of a return address integrity check, a jump address validation check, an external call validation check, a call destination/far jump validation check, an IAT integrity check, a heap integrity check and a library randomization check each invariant check including (a) capturing a state of one or more registers and at least one portion of a data segment of the control section prior to execution of a function call, (b) checking the state after the execution of the function call against the captured state and (c) declaring application layer memory corruption if the checked state and the captured state do not match; and
   correcting the application layer memory corruption of the at least one portion of the control section of original memory, during run-time, by replacing the at least one portion of corrupted memory with a backup of the at least one portion of the control section of original memory to prevent the malicious code from ever executing.

2. The method of claim 1 wherein memory is system or process memory.

3. The method of claim 1 further comprising:
identifying an intention to corrupt the at least one portion of the control section of original memory by a process; and
intercepting the process, during run-time, to prevent corruption of the at least one portion of the control section of original memory.

4. The method of claim 1 further comprising creating a backup of the at least one portion of the control section of original memory.

5. The method of claim 1 wherein detecting the application layer memory corruption of the at least one portion of the control section of original memory comprises comparing a run-time signature of a program or library file with a valid signature during load-time.

6. The method of claim 1 wherein the application layer memory corruption is initiated locally or remotely.

7. The method of claim 1 wherein detecting the application layer memory corruption of the control section of original memory comprises comparing computer program instructions in the memory with non-corrupted computer program instructions.

8. The method of claim 6 wherein the computer program instructions are machine language code.

9. The method of claim 1 wherein detecting the application layer memory corruption of the control section of original memory comprises monitoring program code execution to identify an abnormality.

10. The method of claim 1 wherein memory is configured for storing information for a stack, a heap, machine language instructions, for an executable or a shared library loaded at start up or run time.

11. The method of claim 1 further comprising notifying a user of a security risk pertaining to program code that is permitting the memory corruption of a security risk.

12. The method of claim 1 wherein detecting the application layer memory corruption of at least one portion of the control section of original memory during run-time occurs in a Smart Phone, Personal Digital Assistant (PDA), Mainframe Computer, or Personal Computer (PC).

13. The method of claim 1 further comprising protecting a system from the application layer memory corruption, where the application layer memory corruption originates from vendor software operating without a corrective software patch.

14. The method of claim 1 further comprising providing at least one user with one or more vendor software update patches so as to protect against application layer memory corruption.

15. The method of claim 1 further comprising preparing an identifier for the application layer memory corruption.

16. The method of claim 1 further comprising informing a vendor of one or more actual or potential application layer memory corruptions.

17. The method of claim 1 further comprising receiving payment for the correction of the application layer memory corruption.

18. The method of claim 1 wherein the control section includes any of a heap, stack, import address table and an export address table.

19. An apparatus comprising:
a processor configured to execute a process: the process configured to detect an application layer memory corruption of at least one portion of a control section of original memory by malicious code during run-time, where the application layer memory corruption affects execution flow of an application when otherwise left uncorrected, wherein detecting includes performing at least two different invariant checks from a set of invariant checks at run-time, the set of invariant checks includes at least two of a return address integrity check, a jump address validation check, an external call validation check, a call destination/far jump validation check, an TAT integrity check, a heap integrity check and a library randomization check each invariant check including (a) capturing a state of one or more registers and at least one portion of a data segment of the control section prior to execution of a function call, (b) checking the state after the execution of the function call against the captured state and (c) declaring application layer memory corruption if the checked state and the captured state do not match; and
the process configured to correct the application layer memory corruption of the at least one portion of the control section of original memory, during run-time, by replacing the at least one portion of corrupted memory with a backup of the at least one portion of the control section of original memory to prevent the malicious code from ever executing.

20. The apparatus of claim 19 wherein memory is system or process memory.

21. The apparatus of claim 19 wherein the process is further configured to:
identify an intention to corrupt the at least one portion of the control section of original memory by the process; and
intercept the process, during run-time, to prevent corruption of the at least one portion of the control section of original memory.

22. The apparatus of claim 19 wherein the process is further configured to create a backup of the at least one portion of the control section of original memory.

23. The apparatus of claim 19 wherein the process is further configured to compare a run-time signature of a program or library file with a valid signature during load-time.

24. The apparatus of claim 19 wherein the application layer memory corruption is initiated locally or remotely.

25. The apparatus of claim 19 wherein the process is further configured to compare computer program instructions in the memory with non-corrupted computer program instructions.

26. The apparatus of claim 25 wherein the computer program instructions are machine language code.

27. The apparatus of claim 19 wherein the process is further configured to monitor program code execution to identify an abnormality.

28. The apparatus of claim 19 wherein the memory stores information for a stack, a heap, machine language instructions, for an executable or a shared library loaded at start up or run time.

29. The apparatus of claim 19 wherein the process is further configured to notify a user of a security risk pertaining to program code that is permitting the application layer memory corruption.

30. The apparatus of claim 19 wherein the process operates during run-time in a Smart Phone, Personal Digital Assistant (PDA), Mainframe Computer, or Personal Computer (PC).

31. The apparatus of claim 19 wherein the control section includes any of a heap, stack, import address table and an export address table.

32. A system for correcting memory corruption comprising:
  a processor configured to execute a process: the process creates a backup of at least one portion of a control section of original memory prior to runtime; and
  the process, during run-time, (i) detects an application layer memory corruption of the at least one portion of the control section of original memory by malicious code, where the application layer memory corruption affects execution flow of an application when otherwise left uncorrected, wherein detecting includes performing at least two different invariant checks from a set of invariant checks at run-time, the set of invariant checks includes at least two of a return address integrity check, a jump address validation check, an external call validation check, a call destination/far jump validation check, an TAT integrity check, a heap integrity check and a library randomization check each invariant check including (a) capturing a state of one or more registers and at least one portion of a data segment of the control section prior to execution of a function call, (b) checking the state after the execution of the function call against the captured state and (c) declaring application layer memory corruption if the checked state and the captured state do not match; and (ii) replaces the at least one portion of corrupted memory with the backup to correct the application layer memory corruption of the at least one portion of the control section of original memory and to prevent the malicious code from ever executing.

33. The system of claim 32 wherein the control section includes any of a heap, stack, import address table and an export address table.

* * * * *

UNITED STATES PATENT AND TRADEMARK OFFICE
CERTIFICATE OF CORRECTION

| | | |
|---|---|---|
| PATENT NO. | : 8,510,596 B1 | Page 1 of 1 |
| APPLICATION NO. | : 11/825657 | |
| DATED | : August 13, 2013 | |
| INVENTOR(S) | : Gupta et al. | |

It is certified that error appears in the above-identified patent and that said Letters Patent is hereby corrected as shown below:

In the Claims:

In column 36, Claim 19, line 11, delete "TAT" and insert --IAT--.

In column 37, Claim 32, line 17, delete "TAT" and insert --IAT--.

Signed and Sealed this
Twelfth Day of November, 2013

Teresa Stanek Rea
*Deputy Director of the United States Patent and Trademark Office*